(12) United States Patent
Morin et al.

(10) Patent No.: US 10,763,481 B2
(45) Date of Patent: *Sep. 1, 2020

(54) LITHIUM STORAGE DEVICE WITH IMPROVED SAFETY ARCHITECTURE

(71) Applicant: Soteria Battery Innovation Group, Inc., Greenville, SC (US)

(72) Inventors: Brian G. Morin, Greenville, SC (US); Carl C. Hu, Taylors, SC (US)

(73) Assignee: Soteria Battery Innovation Group Inc., Greenville, SC (US)

(*) Notice: Subject to any disclaimer, the term of this patent is extended or adjusted under 35 U.S.C. 154(b) by 59 days.

This patent is subject to a terminal disclaimer.

(21) Appl. No.: 15/927,075

(22) Filed: Mar. 20, 2018

(65) Prior Publication Data

US 2019/0081305 A1 Mar. 14, 2019

Related U.S. Application Data

(63) Continuation-in-part of application No. 15/700,077, filed on Sep. 9, 2017.

(51) Int. Cl.
*H01M 2/00* (2006.01)
*H01M 2/16* (2006.01)
(Continued)

(52) U.S. Cl.
CPC ....... *H01M 2/1686* (2013.01); *H01M 2/1646* (2013.01); *H01M 2/1653* (2013.01);
(Continued)

(58) Field of Classification Search
CPC ............. H01M 2/1686; H01M 2/1646; H01M 2/1653; H01M 2/348; H01M 2/16;
(Continued)

(56) References Cited

U.S. PATENT DOCUMENTS

| 6,413,676 B1* | 7/2002 | Munshi ................. H01M 4/131 429/303 |
| 2018/0198132 A1 | 7/2018 | Liang et al. |

FOREIGN PATENT DOCUMENTS

| JP | 09283149 A | 10/1997 |
| JP | 1167221 A | 3/1999 |

* cited by examiner

*Primary Examiner* — Raymond Alejandro
(74) *Attorney, Agent, or Firm* — William S. Parks

(57) ABSTRACT

Improvements in the structural components and physical characteristics of lithium battery articles are provided. Standard lithium ion batteries, for example, are prone to certain phenomena related to short circuiting and have experienced high temperature occurrences and ultimate firing as a result. Structural concerns with battery components have been found to contribute to such problems. Improvements provided herein include the utilization of thin metallized current collectors (aluminum and/or copper, as examples), high shrinkage rate materials, materials that become nonconductive upon exposure to high temperatures, and combinations thereof. Such improvements accord the ability to withstand certain imperfections (dendrites, unexpected electrical surges, etc.) within the target lithium battery through provision of ostensibly an internal fuse within the subject lithium batteries themselves that prevents undesirable high temperature results from short circuits. Battery articles and methods of use thereof including such improvements are also encompassed within this disclosure.

2 Claims, 12 Drawing Sheets

(51) Int. Cl.
    *H01M 10/0525*    (2010.01)
    *H01M 4/70*    (2006.01)
    *H01M 4/66*    (2006.01)
    *H01M 10/052*    (2010.01)
    *H01M 2/34*    (2006.01)

(52) U.S. Cl.
    CPC ........... *H01M 4/667* (2013.01); *H01M 4/668* (2013.01); *H01M 4/70* (2013.01); *H01M 10/052* (2013.01); *H01M 10/0525* (2013.01); *H01M 2/348* (2013.01); *H01M 2200/103* (2013.01)

(58) Field of Classification Search
    CPC ...... H01M 4/70; H01M 4/134; H01M 10/052; H01M 10/0525; H01M 10/425; H01M 2004/027; H01M 2004/028; H01M 2200/103
    See application file for complete search history.

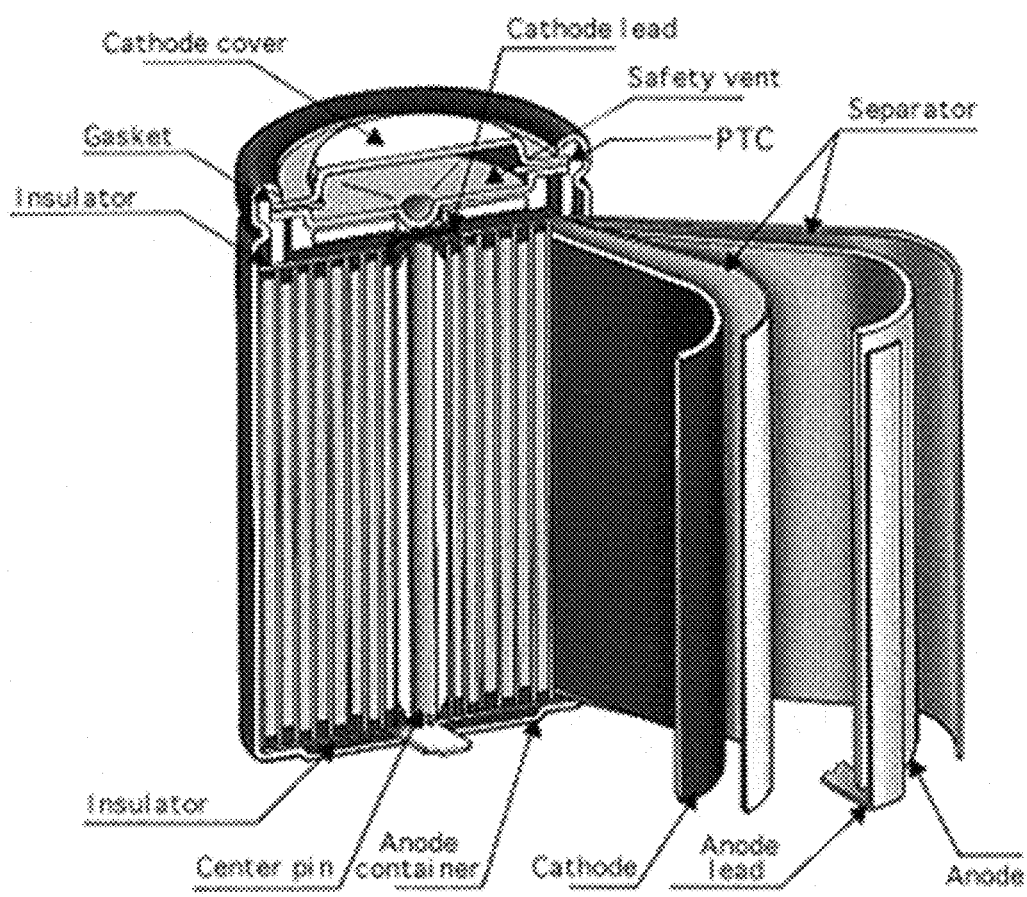
Fig. 1 – Wound Cell
Prior Art

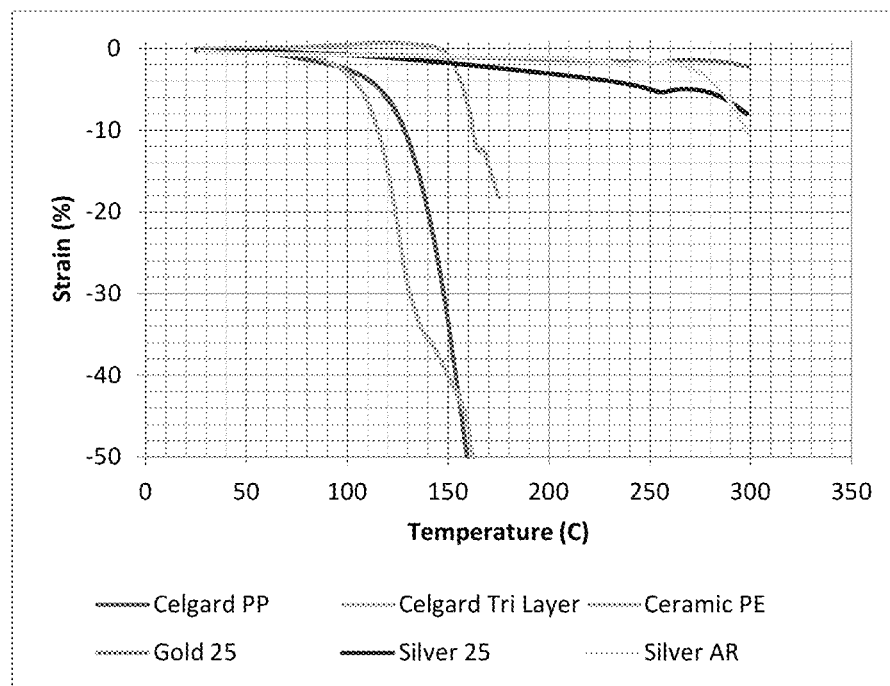
Figure 2: Separator Shrinkage
Prior Art

SEM of cross section of nail-penetrated cell
Prior Art

Zoom in of SEM of cross section of nail penetrated cell Aluminum current collector.
Prior Art Figure 5: An oxidizing metal at very low total metal thickness Traditional current Collector Thick conductive oxidative layer Inventive current Collector Thin conductive oxidative layer Non-conductive layer Thin conductive oxidative layer Figure 6A: Comparative Example 1 after touching with hot solder iron
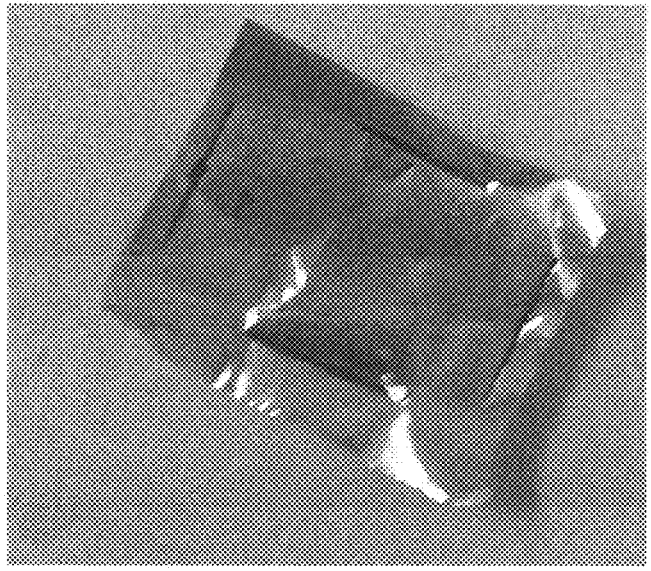
Figure 6B: Comparative Example 2 after touching with hot solder iron
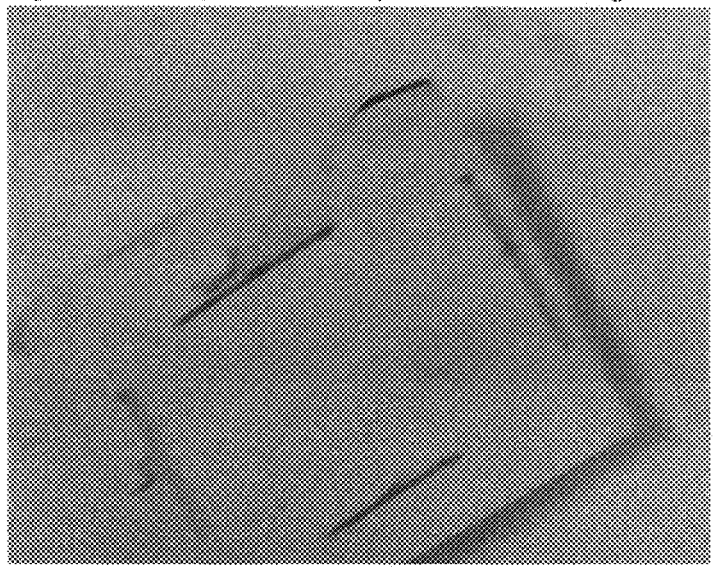

Figure 7A: Example 1 after touching with hot solder iron
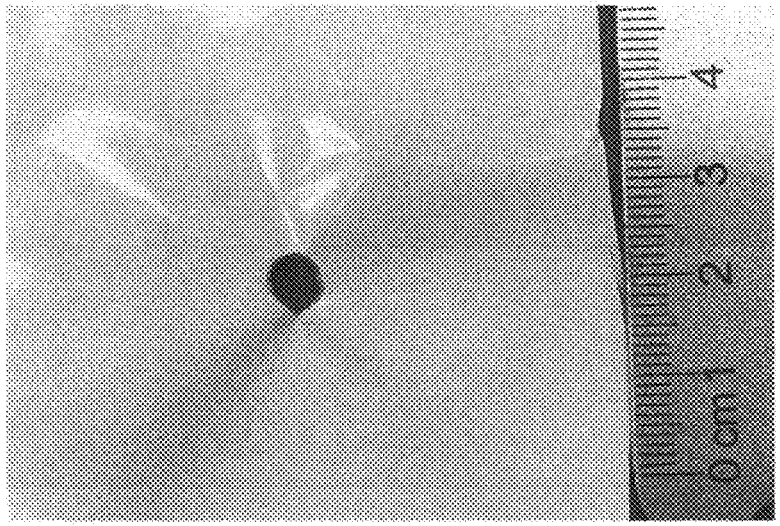
Figure 7B: Example 2 after touching with hot solder iron
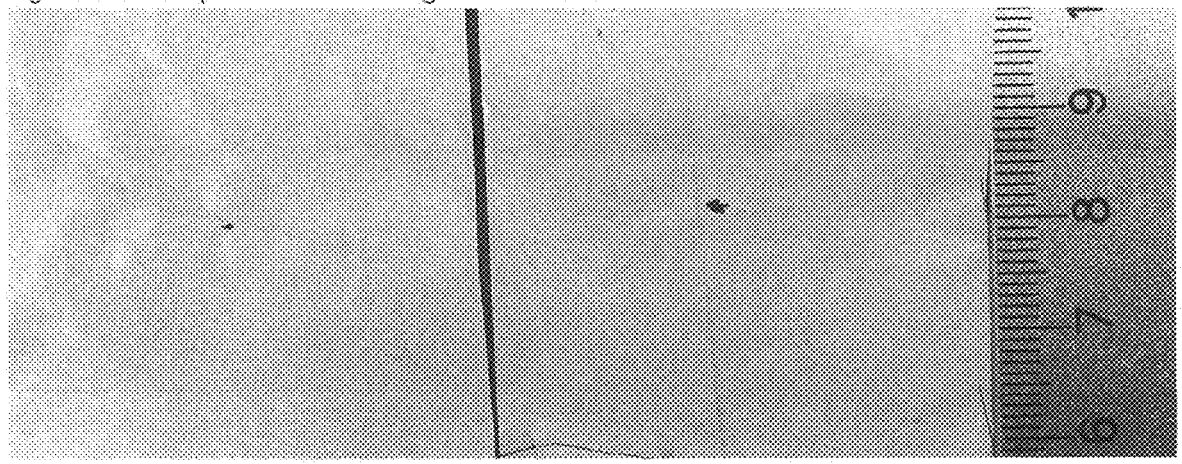
Figure 7C: Example 3 after touching with hot solder iron
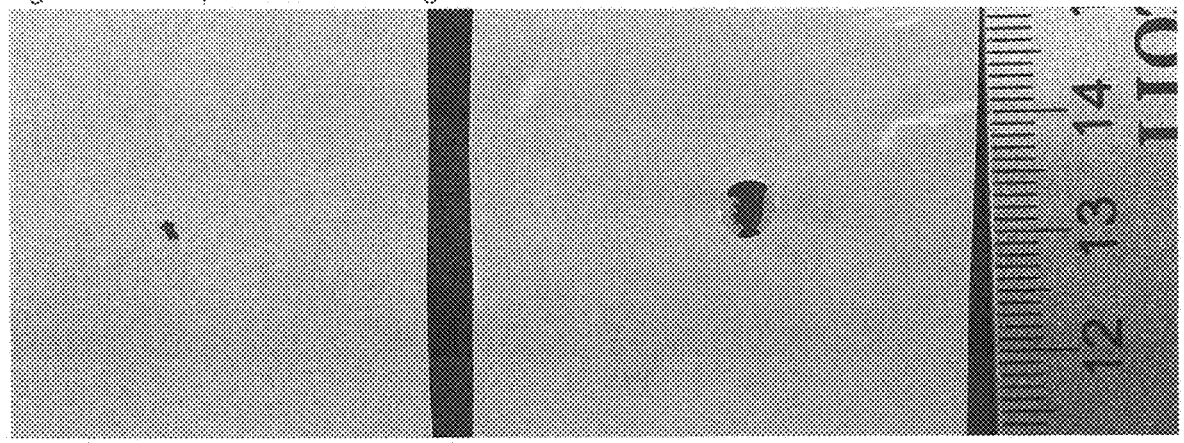

Figure 8A: Example 4 after touching with hot solder iron
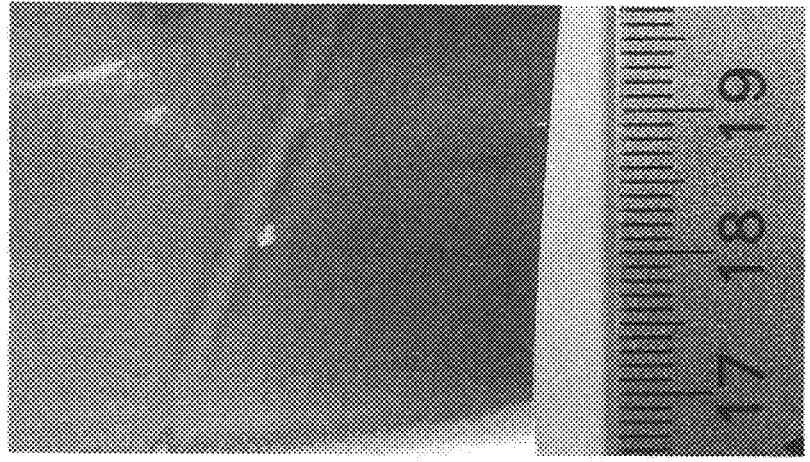
Figure 8B: Example 5 after touching with hot solder iron
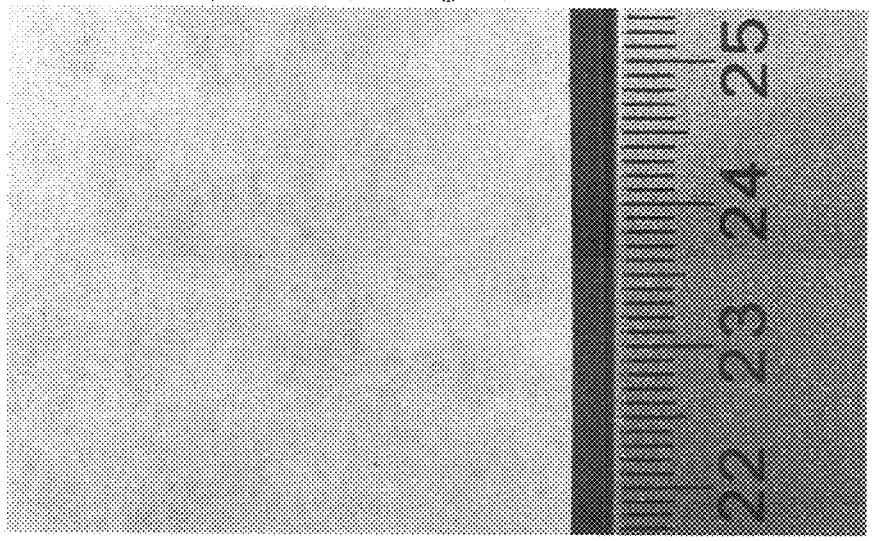
Figure 8C: Example 6 after touching with hot solder iron
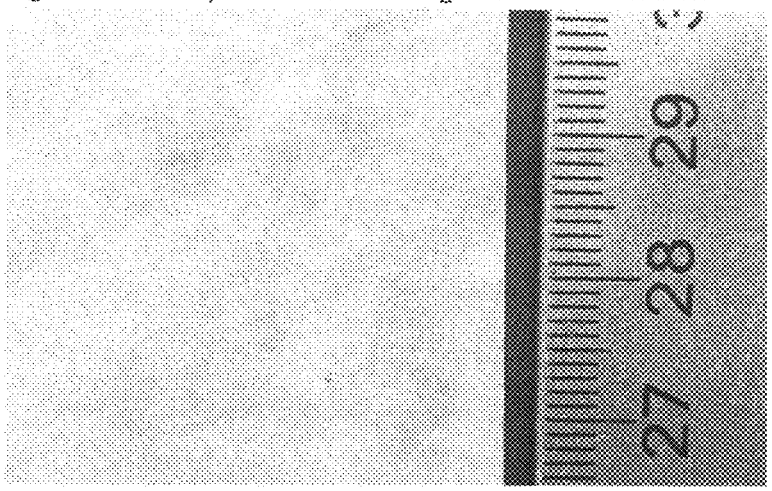

Figure 10A: Comparative Example 3 after shorting at 4.0 V
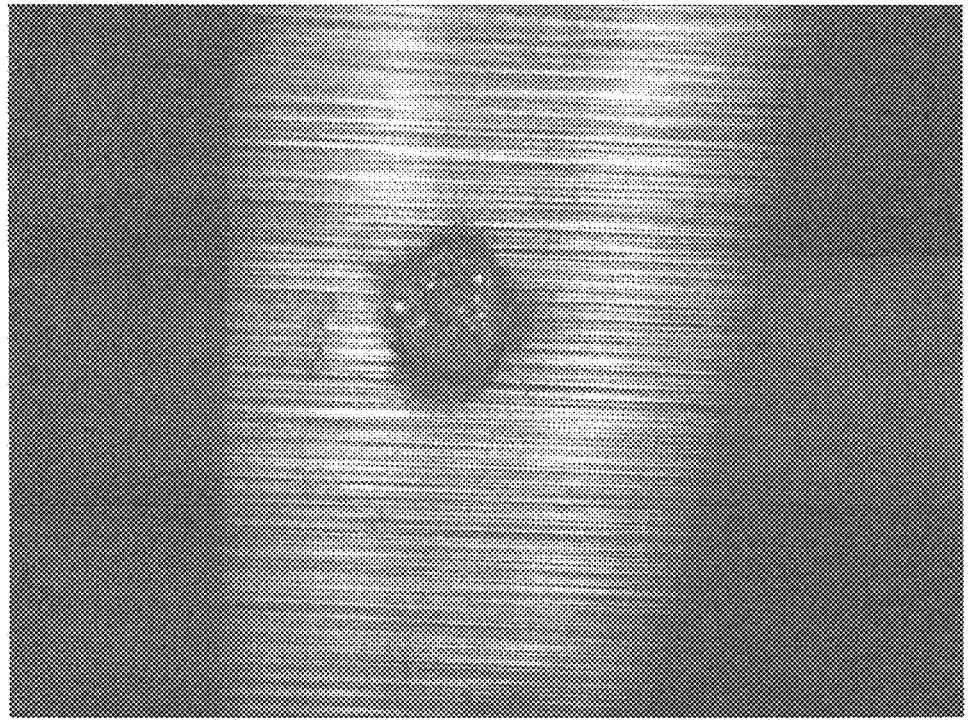
Figure 10B: Comparative Example 4 after shorting at 4.0 V
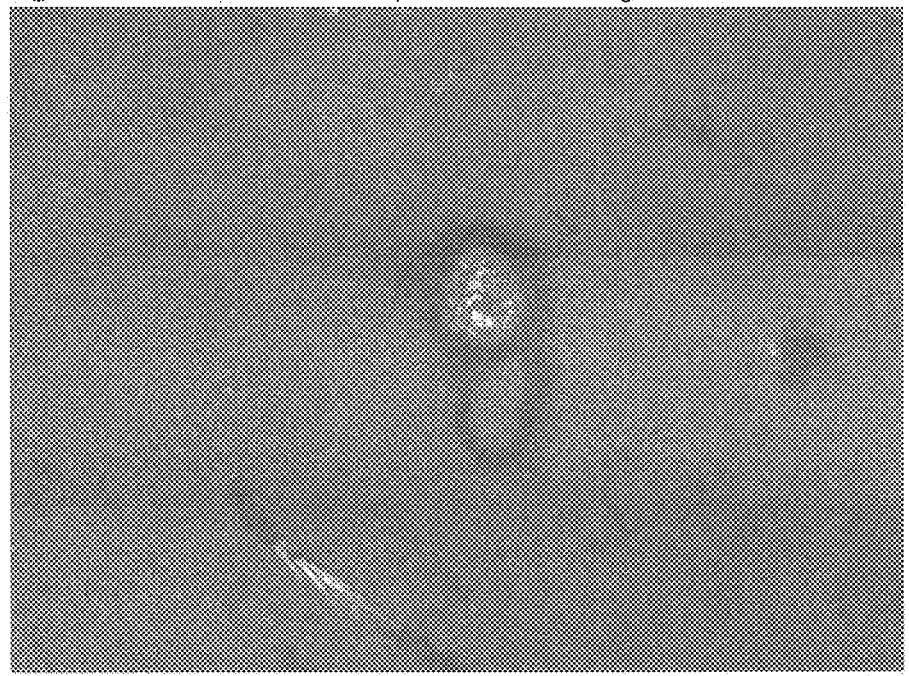

Figure 11A: Example 14 after shorting at 4.0 V
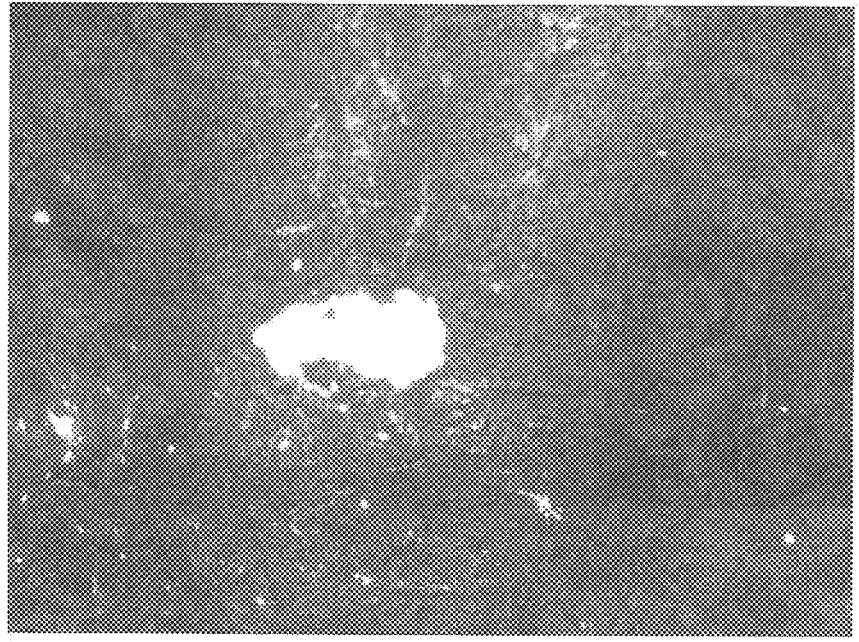
Figure 11B:
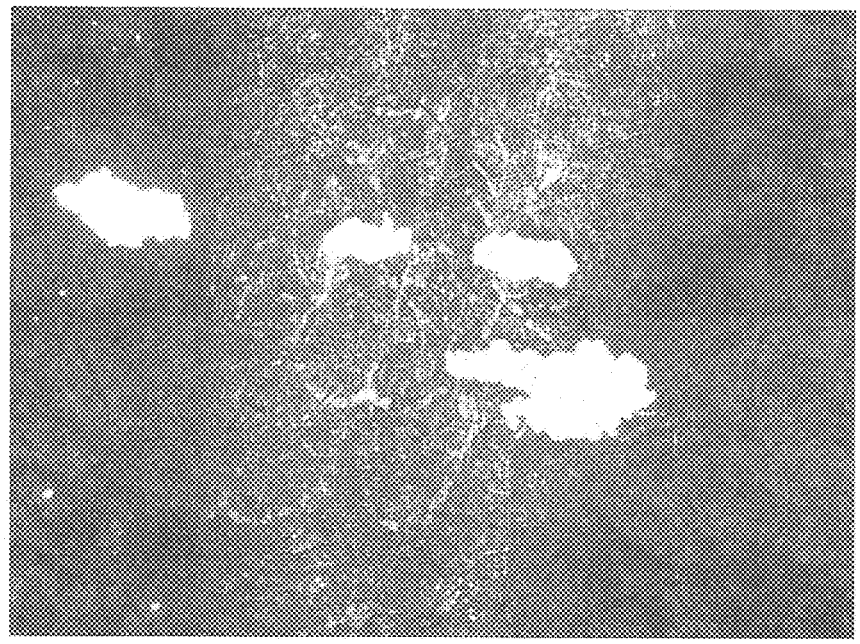

LITHIUM STORAGE DEVICE WITH IMPROVED SAFETY ARCHITECTURE

CROSS-REFERENCE TO RELATED APPLICATION

This application is a continuation-in-part of pending U.S. patent application Ser. No. 15/700,077, filed on Sep. 9, 2017, the entirety of which is herein incorporated by reference.

FIELD OF THE INVENTION

The present disclosure relates to improvements in the structural components and physical characteristics of lithium battery articles. Standard lithium ion batteries, for example, are prone to certain phenomena related to short circuiting and have experienced high temperature occurrences and ultimate firing as a result. Structural concerns with battery components have been found to contribute to such problems. Improvements provided herein include the utilization of thin metallized current collectors (aluminum and/or copper, as examples), high shrinkage rate materials, materials that become nonconductive upon exposure to high temperatures, and combinations thereof. Such improvements accord the ability to withstand certain imperfections (dendrites, unexpected electrical surges, etc.) within the target lithium battery through provision of ostensibly an internal fuse within the subject lithium batteries themselves that prevents undesirable high temperature results from short circuits. Battery articles and methods of use thereof including such improvements are also encompassed within this disclosure.

BACKGROUND OF THE PRIOR ART

Lithium batteries remain prevalent around the world as an electricity source within a myriad of products. From rechargeable power tools, to electronic cars, to the ubiquitous cellular telephone (and like tablets, hand-held computers, etc.), lithium batteries (of different ion types) are utilized as the primary power source due to reliability, above-noted rechargeability, and longevity of usage. With such widely utilized power sources, however, comes certain problems, some of which have proven increasingly serious. Notably, safety issues have come to light wherein certain imperfections within such lithium batteries, whether due to initial manufacturing issues or time-related degradation problems, cause susceptibility to firing potentials during short circuit events. Basically, internal defects with conductive materials have been found to create undesirable high heat and, ultimately, fire, within such battery structures. As a result, certain products utilizing lithium batteries, from hand-held computerized devices (the Samsung Galaxy Note 7, as one infamous situation) to entire airplanes (the Boeing 787) have been banned from sales and/or usage until solutions to compromised lithium batteries used therein and therewith have been provided (and even to the extent that the Samsung Galaxy Note 7 has been banned from any airplanes in certain regions). Even the Tesla line of electric cars have exhibited notable problems with lithium battery components, leading to headline-grabbing stories of such expensive vehicles exploding as fireballs due to battery issues. Widespread recalls or outright bans thus remain today in relation to such lithium battery issues, leading to a significant need to overcome such problems.

These problems primarily exist due to manufacturing issues, whether in terms of individual battery components as made or as such components are constructed as individual batteries themselves. Looked at more closely, lithium batteries are currently made from six primary components, a cathode material, a cathode current collector (such as aluminum foil) on which the cathode material is coated, an anode material, an anode current collector (such as copper foil) on which the anode material is coated, a separator situated between each anode and cathode layer and typically made from a plastic material, and an electrolyte as a conductive organic solvent that saturates the other materials thereby providing a mechanism for the ions to conduct between the anode and cathode. These materials are typically wound together into a can, as shown in Prior Art FIG. 1, or stacked. There are many other configurations that are and may be utilized for such battery production purposes, including pouch cells, prismatic cells, coin cells, cylindrical cells, wound prismatic cells, wound pouch cells, and the list goes on. These battery cells, when made correctly and handled gently, can provide energy for various applications for thousands of charge-discharge cycles without any appreciable safety incident. However, as alluded to above, certain events and, in particular, certain defects can cause internal shorting between the internal conductive materials which can lead to heat generation and internal thermal runaway, known to be the ultimate cause of fire hazards within such lithium batteries. Such events may further be caused by, as noted above, internal defects including the presence of metallic particles within the battery, burrs on the current collector materials, thin spots or holes in the separator (whether included or caused during subsequent processing), misalignments of battery layers (leaving "openings" for unwanted conductivity to occur), external debris penetrating the battery (such as road debris impacting a moving vehicle), crushing and/or destabilizing of the cell itself (due to accidents, for instance), charging the cell in a confined space, and the like. Generally speaking, these types of defects are known to cause generation of a small electronic conductive pathway between the anode and cathode. When such an event occurs, if the cell is then charged, such a conductive pathway may then cause a discharge of the cell therethrough which ultimately generates excessive heat, thereby compromising the battery structure and jeopardizing the underlying device being powered thereby. Combined with the presence of flammable organic solvent materials as battery electrolytes (which are generally of necessity for battery operability), such excessive heat has been shown to cause ignition thereto, ultimately creating a very dangerous situation. Such problems are difficult to control once started, at the very least, and have led to significant injuries to consumers. Such a potential disastrous situation is certainly to be avoided through the provision of a battery that delivers electrical energy while not compromising the flammable organic electrolyte in such a manner.

The generation of excessive heat internally may further create shrinkage of the plastic separator, causing it to move away from, detach, or otherwise increase the area of a short within the battery. In such a situation, the greater exposed short area within the battery may lead to continued current and increased heating therein, leading to the high temperature event which causes significant damage to the cell, including bursting, venting, and even flames and fire. Such damage is particularly problematic as the potential for firing and worse comes quickly and may cause the battery and potentially the underlying device to suffer an explosion as a result, putting a user in significant danger as well.

Lithium batteries (of many varied types) are particularly susceptible to problems in relation to short circuiting. Typical batteries have a propensity to exhibit increased discharge rates with high temperature exposures, leading to uncontrolled (runaway) flaring and firing on occasion, as noted above. Because of these possibilities, certain regulations have been put into effect to govern the actual utilization, storage, even transport of such battery articles. The ability to effectuate a proper protocol to prevent such runaway events related to short circuiting is of enormous importance, certainly. The problem has remained, however, as to how to actually corral such issues, particularly when component production is provided from myriad suppliers and from many different locations around the world.

Some have honed in on trying to provide proper and/or improved separators as a means to help alleviate potential for such lithium battery fires. Low melting point and/or shrinkage rate plastic membranes appear to create higher potentials for such battery firing occurrences. The general thought has then been to include certain coatings on such separator materials without reducing the electrolyte separation capabilities thereof during actual utilization. Thus, ceramic particles, for instance, have been utilized as polypropylene and/or polyethylene film coatings as a means to increase the dimensional stability of such films (increase melting point, for example). Binder polymers have been included, as well, as a constituent to improve cohesion between ceramic particles and adhesion to the plastic membrane (film). In actuality, though, the thermal increase imparted to the overall film structure with ceramic particle coatings has been found to be relatively low, thus rendering the dominant factor for such a separator issue to be the actual separator material(s) itself.

As a result, there have been designed and implemented, at least to a certain degree, separator materials that are far more thermally stable than the polyethylene and polypropylene porous films that make up the base layer of such typical ceramic-coated separators. These low shrinkage, dimensionally stable separators exhibit shrinkage less than 5% when exposed to temperatures of at least 200° C. (up to temperatures of 250, 300, and even higher), far better than the high shrinkage rates exhibited by bare polymer films (roughly 40% shrinkage at 150° C.), and of ceramic-coated films (more than 20% at 180° C.) (such shrinkage measurement comparisons are provided in Prior Art FIG. 2). Such low shrinkage rate materials may change the mechanism of thermal degradation inside a target cell when a short occurs. Generally speaking, upon the occurrence of a short within such a battery cell, heat will always be generated. If the separator does not shrink in relation to such a short circuit event, heat will continue to be generated and "build up" until another material within the battery degrades. This phenomenon has been simulated with an industry standard nail penetration test. For instance, even with a separator including para-aramid fiber and exhibiting a shrinkage stability up to 550° C., the subject test battery showed a propensity to short circuit with unique internal results. Such a cell was investigated more closely subsequent to such treatment wherein the cell was opened, the excess electrolyte was evaporated, the cell filled with epoxy and then sectioned perpendicular to the nail, which was left in the cell. Scanning electron microscope images were then undertaken using backscattered electron imaging (BEI), which enabled mapping of the different battery elements to show the effect of such a nail penetration activity. These are shown in Prior Art FIGS. 3a and 3b.

In Prior Art FIG. 3a, it is noted that the copper layers consistently come closer to the nail than the aluminum layers. It is also noted that the high stability separator is still intact between the electrodes. Prior Art FIG. 3b shows a higher magnification of the end of one aluminum layer, showing that it ends in a layer of cracked grey matter. This was investigated with BEI, which showed the resultant matter to actually be aluminum oxide, an insulating ceramic. Such evidence led to the proposed conclusion that when the separator itself is thermally stable, the aluminum current collector will oxidize, effectively breaking the circuit (and stopping, as a result, any short circuit once the insulating aluminum oxide is formed). Once the circuit is broken, the current stops flowing and the heat is no longer generated, reversing the process that, with less stable separators, leads to thermal runaway.

This possible solution, however, is limited to simply replacing the separator alone with higher shrinkage rate characteristics. Although such a simple resolution would appear to be of great value, there still remains other manufacturing procedures and specified components (such as ceramic-coated separator types) that are widely utilized and may be difficult to supplant from accepted battery products. Thus, despite the obvious benefits of the utilization and inclusion of thermally stable separators, undesirable battery fires may still occur, particularly when ceramic coated separator products are considered safe for such purposes. Thus, it has been determined that there is at least another, solely internal battery cell structural mechanism that may remedy or at least reduce the chance for heat generation due to an internal short in addition to the utilization of such highly thermal stable separator materials. In such a situation, the occurrence of a short within such a battery cell would not result in deleterious high temperature damage due to the cessation of a completed internal circuit through a de facto internal fuse creation. Until now, however, nothing has been presented within the lithium battery art that easily resolves these problems. The present disclosure provides such a highly desirable cure making lithium battery cells extremely safe and reliable within multiple markets.

ADVANTAGES AND SUMMARY OF THE DISCLOSURE

A distinct advantage of this disclosure is the ability through structural components to provide a mechanism to break the conductive pathway when an internal short occurs, stopping or greatly reducing the flow of current that may generate heat within the target battery cell. Another advantage is the ability to provide such a protective structural format within a lithium battery cell that also provides beneficial weight and cost improvements for the overall cell manufacture, transport and utilization. Thus, another advantage is the generation and retention of an internal fuse structure within a target battery cell until the need for activation thereof is necessitated. Another advantage is the provision of a lower weight battery through the utilization of a thin film base current collector that prevents thermal runaway during a short circuit or like event. Still another advantage is the ability to utilize flammable organic electrolytes materials within a battery without any appreciable propensity for ignition thereof during a short circuit or like event.

Accordingly, this inventive disclosure encompasses an energy storage device comprising an anode, a cathode, at least one polymeric or fabric separator present between said anode and said cathode, an electrolyte, and at least one current collector in contact with at least one of said anode and said cathode; wherein either of said anode or said cathode are interposed between at least a portion of said current collector and said separator, wherein said current collector comprises a conductive material coated on a polymeric material substrate, and wherein said current collector stops conducting at the point of contact of an exposed short circuit at the operating voltage of said energy storage device, wherein said voltage is at least 2.0 volts. One example would be a current density at the point of contact of 0.1 amperes/mm$^2$ with a tip size of 1 mm$^2$ or less. Of course, for larger cells, the required threshold current density may be higher, and the cell may only stop conducting at a current density of at least 0.3 amperes/mm$^2$, such as at least 0.6 amperes/mm$^2$, or even at least 1.0 amperes/mm$^2$. Such a coated polymeric material substrate should also exhibit an overall thickness of at most 25 microns, as described in greater detail below. Methods of utilizing such a beneficial current collector component within an energy storage device (whether a battery, such as a lithium ion battery, a capacitor, and the like) are also encompassed within this disclosure.

Additionally, much larger current densities may be supported for a very short period of time, or in a very small tipped probe. In such a situation, a larger current, such as 5 amperes, or 10 amperes, or even 15 amperes, may be connected for a very short time period [for example, less than a second, alternatively less than 0.1 seconds, or even less than 1 millisecond (0.001 seconds)]. Within the present disclosure, while it may be possible to measure a larger current, the delivery time for such a current is sufficiently short such that the total energy delivered is very small and not enough to generate enough heat to cause a thermal runaway event within the target battery cell. For example, a short within a conventional architecture cell has been known to generate 10 amperes for 30 seconds across 4.2 volts, a result that has delivered 1200 joules of energy to a small local region within such a battery. This resultant measurement can increase the temperature of a 1-gram section of the subject battery by about 300° C., a temperature high enough to not only melt the conventional separator material present therein, but also drive the entire cell into a runaway thermal situation (which, as noted above, may cause the aforementioned compromise of the electrolyte materials present therein and potential destruction of not only the subject battery but the device/implement within which it is present and the surrounding environment as well. Thus, it is certainly a possibility that the ability to reduce the time for short circuit duration, as well as the resulting delivered energy levels associated within such a short to a low joules measurement, thermal runaway (and the potential disaster associated therewith) may be avoided, if not completely prevented. For instance, the reduction of short circuit residence time within a current collector to 1 millisecond or less can then subsequently reduce the amount of delivered energy to as low as 0.04 joules (as opposed to 1200 joules, as noted above, leading to excessive, 300 degrees Celsius or greater, for example, within a 1-gram local region of the subject battery). Such a low level would thus only generate a temperature increase of 0.01° C. within such a 1-gram local region of battery, thus preventing thermal runaway within the target cell and thus overall battery.

Therefore, it is another significant advantage of the present disclosure to provide battery a current collector that drastically limits the delivery time of a current level applied to the target current collector surface through a probe tip (in order to controllably emulate the effect of an internal manufacturing defect, a dendrite, or an external event which causes an internal short within the subject battery) to less than 1 second, preferably less than 0.01 seconds, more preferably less than 1 millisecond, and most preferably, perhaps, even less than 100 microseconds, particularly for much larger currents. Of course, such a current would be limited to the internal voltage of the cell, which might be 5.0 V, or 4.5 V, or 4.2 V or even less, such as 4.0 V or 3.8 V, but with a minimum of 2.0 V.

Such a novel current collector component is actually counterintuitive to those typically utilized and found within lithium (and other types) of batteries and energy storage devices today. Standard current collectors are provided are conductive metal structures, such as aluminum and/or copper panels of thicknesses that are thought to provide some type of protection to the overall battery, etc., structure. These typical current collector structures are designed to provide the maximum possible electrical conductivity within weight and space constraints. It appears, however, that such a belief has actually been misunderstood, particularly since the thick panels prevalent in today's energy storage devices will actually not only arc when a short occurs, but contribute greatly to runaway temperatures if and when such a situation occurs. Such a short may be caused, for example, by a dendritic formation within the separator. Such a malformation (whether caused at or during manufacture or as a result of long-term usage and thus potential degradation) may allow for voltage to pass unexpectedly from the anode to the cathode, thereby creating an increase in current and consequently in temperature at the location such occurs. Indeed, one potential source of short circuit causing defect are burrs that form on the edges of these thick typical current collectors when they are slit or cut with worn blades during repetitive manufacturing processes of multiple products (as is common nowadays). It has been repeatedly analyzed and understood, however, that the standard current collector materials merely exhibit a propensity to spark and allow for temperature increase, and further permitting the current present during such an occurrence to continue through the device, thus allowing for unfettered generation and movement, leaving no means to curtail the current and thus temperature level from increasing. This problem leads directly to runaway high temperature results; without any internal means to stop such a situation, the potential for fire generation and ultimately device immolation and destruction is typically imminent. Additionally, the current pathway (charge direction) of a standard current collector remains fairly static both before and during a short circuit event, basically exhibiting the same potential movement of electric charge as expected with movement from cathode to anode and then horizontally along the current collector in a specific direction. With a short circuit, however, this current pathway fails to prevent or at least curtail or delay such charge movement, allowing, in other words, for rapid discharge in runaway fashion throughout the battery itself. Coupled with the high temperature associated with such rapid discharge leads to the catastrophic issues (fires, explosions, etc.) noted above.

To the contrary, and, again, highly unexpected and counterintuitive to the typical structures and configurations of lithium batteries, at least, the utilization of a current collector of the instant disclosure results in an extremely high current density measurement (due to the reduced thickness of the conductive element) and prevention of charge movement (e.g., no charge direction) in the event of a short circuit. In other words, with the particular structural limitations accorded the disclosed current collector component herein, the current density increases to such a degree that the resistance level imparts an extremely high, but contained, high temperature occurrence in relation to a short circuit. This resistance level thus causes the conductive material (e.g., as merely examples, aluminum and/or copper) to receive the short circuit charge but, due to the structural formation provided herein, the conductive material reacts immediately in relation to such a high temperature, localized charge. Combined with the other structural considerations of such a current collector component, namely the actual lack of a dimensionally stable polymeric material in contact with such a conductive material layer, the conductive material oxidizes instantly at the charge point thereon, leaving, for example, aluminum or cupric oxide, both nonconductive materials. With such instantaneous nonconductive material generation, the short circuit charge appears to dissipate as there is no direction available for movement thereof. Thus, with the current collector as now described, an internal short circuit occurrence results in an immediate cessation of current, effectively utilizing the immediate high temperature result from such a short to generate a barrier to further charge movement. As such, the lack of further current throughout the body of the energy storage device (in relation to the short circuit, of course) mutes such an undesirable event to such a degree that the short is completely contained, no runaway current or high temperature result occurs thereafter, and, perhaps most importantly, the current collector remains viable for its initial and protective purposes as the localized nonconductive material then present does not cause any appreciable reduction in current flow when the energy storage device (battery, etc.) operates as intended. Furthermore, the relatively small area of nonconductive material generation leaves significant surface area, etc., on the current collector, for further utilization without any need for repair, replacement, or other remedial action. The need to ensure such a situation, which, of course, does not always occur, but without certain precautions and corrections, as now disclosed, the potential for such a high temperature compromise and destruction event actually remains far higher than is generally acceptable. Thus, the entire current collector, due to its instability under the conditions of a short circuit, becomes a two-dimensional electrical fuse, preventing the potentially disastrous high currents associated with short circuits by using the instantaneous effect of that high current to destroy the ability of the current collector to conduct current at the point of the short circuit.

Such advantages are permitted in relation to such a novel resultant current collector that may be provided, with similar end results, through a number of different alternatives. In any of these alternative configurations, such a current collector as described herein functions ostensibly as an internal fuse within a target energy storage device (e.g., lithium battery, capacitor, etc.). In each instance (alternative), however, there is a current collector including a polymeric layer that is metallized on one or both sides thereof with at least one metallized side in contact with the anode or cathode of the target energy storage device. One alternative then is where the total thickness of the entire metallized (coated) polymeric substrate of the current collector is less than 20 microns, potentially preferably less than 15 microns, and potentially more preferably less than 10 microns, all with a resistance measurement of less than 1 ohm/square potentially preferably less than 0.1 ohms/square, and potentially more preferably less than 50 ohms/square. Typical current collectors may exhibit these features but do so at far higher weight than those made with reinforcing polymeric substrates and without the inherent safety advantages of this presently disclosed variation. For example, a copper foil at 10 microns thick may weight 90 grams/m$^2$. However, a copperized foil may weight as little as 50 grams/m$^2$, or even as little as 30 gram/m$^2$, or even less than 20 grams/m$^2$, all while delivering adequate electrical performance required for the cell to function. In this alternative structure, however, the very thin component also allows for a short to react with the metal coat and in relation to the overall resistance levels to generate, with an excessively high temperature due to a current spike during such a short, a localized region of metal oxide that immediately prevents any further current movement therefrom.

Another possible alternative for such a novel current collector is the provision of a temperature dependent metal (or metallized) material that either shrinks from a heat source during a short or easily degrades at the specific material location into a nonconductive material (such as aluminum oxide from the aluminum current collector, as one example)(as alluded to above in a different manner). In this way, the current collector becomes thermally weak, in stark contrast to the aluminum and copper current collectors that are used today, which are quite thermally stable to high temperatures. As a result, an alloy of a metal with a lower inherent melting temperature may degrade under lower shorting current densities, improving the safety advantages of the lithium-based energy device disclosed herein. Another alternative is to manufacture the current collector by coating a layer of conductive material, for example copper or aluminum, on fibers or films that exhibit relatively high shrinkage rates at relatively low temperatures. Examples of these include thermoplastic films with melt temperatures below 250° C., or even 200° C., and can include as non-limiting examples polyethylene terephthalate, nylon, polyethylene or polypropylene. Another possible manner of accomplishing such a result is to manufacture a current collector by coating a layer of conductive material, for example copper or aluminum, as above, on fibers or films that can swell or dissolve in electrolyte when the materials are heated to relatively high temperatures compared to the operating temperatures of the cells, but low compared to the temperatures that might cause thermal runaway. Examples of such polymers that can swell in lithium ion electrolytes include polyvinylidiene fluoride and poly acrylonitrile, but there are others known to those with knowledge of the art. Yet another way to accomplish such an alternative internal electrical fuse generating process is to coat onto a substrate a metal, for example aluminum, that can oxidize under heat, at a total metal thickness that is much lower than usually used for lithium batteries. For example, a very thin aluminum current collector as used today may be 20 microns thick. A coating thickness of a total of less than 5 microns would break the circuit faster, and one less than 2 microns, or even less than 1 micron would break the circuit even faster. Even still, another way to accomplish the break in conductive pathway is to provide a current collector with limited conductivity that will degrade in the high current densities that surround a short, similar to the degradation found today in commercial fuses. This could be accomplished by providing a current collector with a resistivity of greater than 5 mOhm/square, or 10 mOhm/square, or potentially preferably greater than 20 mOhm/square, or, a potentially more preferred level of greater than 50 mOhm/square. These measurements could be on one side, or on both sides of a material coated on both sides. The use of current collectors of different resistivities may further be selected differently for batteries that are designed for high power, which might use a relatively low resistance compared to cells designed for lower power and higher energy, and/or which might use a relatively high resistance. Still another way to accomplish the break in conductive pathway is to provide a current collector that will oxidize into a nonconductive material at temperatures that are far lower than aluminum, thus allowing the current collector to become inert in the area of the short before the separator degrades. Certain alloys of aluminum will oxidize faster than aluminum itself, and these alloys would cause the conductive pathway to deteriorate faster or at a lower temperature. As possible alternatives, there may be employed any type of metal in such a thin layer capacity and that exhibits electrical conductivity, including, without limitation, gold, silver, vanadium, rubidium, iridium, indium, platinum, and others (basically, with a very thin layer, the costs associated with such metal usage may be reduced drastically without sacrificing conductivity and yet still allowing for the protections from thermal runaway potentials during a short circuit or like event). As well, layers of different metals may be employed or even discrete regions of metal deposited within or as separate layer components may be utilized. Certainly, too, one side of such a coated current collector substrate may include different metal species from the opposing side, and may also have different layer thicknesses in comparison, as well.

One way to improve the electrical properties of the cell would be to ensure that a coated current collector includes two conductive coated sides, ostensibly allowing for conductivity from the coating on one side to the coating on the other side. Such a result is not possible for a non-coated polymer film, for instance. However, it has been realized that such a two-sided conductivity throughput can be achieved by, as one non-limiting example, a nonwoven including a certain percentage of conducting fibers, or a nonwoven loaded with conductive materials, or a nonwoven made from a conductive material (such as carbon fibers or metal fibers), or, as noted above, a nonwoven containing fibers coated with a conductive material (such as fibers with a metal coating on the surface). Another type of novel thin current collector material exhibiting top to bottom conductivity may be a film that has been made conductive, such as through the utilization of an inherently conductive material (such as, for example, conductive polymers such as polyacetylene, polyaniline, or polyvinylpyrrolidine), or via loading with a conductive material (such as graphite or graphene or metal particles or fibers) during or after film manufacture. Additionally, another possible two-sided thin current collector material is a polymer substrate having small perforated holes with sides coated with metal (aluminum or copper) during the metallization process. Such a conductivity result from one side to the other side would not need to be as conductive as the conductive coatings.

Thus, such alternative configurations garnering ostensibly the same current collector results and physical properties include a) wherein the total thickness of the coated polymeric substrate is less than 20 microns with resistance less than 1 ohm/square, b) the collector comprising a conductive material coated on a substrate comprising polymeric material, wherein the polymeric material exhibits heat shrinkage at 225° C. of at least 5%, c) wherein the collector metallized polymeric material swells in the electrolyte of the battery, such swelling increasing as the polymeric material is heated, d) wherein the collector conductive material total thickness is less than 5 microns when applied to a polymeric substrate, e) wherein the conductivity of the current collector is between 10 mOhm/square and 1 ohm/square, and f) wherein the metallized polymeric substrate of the collector exhibits at most 60% porosity. The utilization of any of these alternative configurations within an energy storage device with a separator exhibiting a heat shrinkage of less than 5% after 1 hour at 225° C. would also be within the purview of this disclosure. The overall utilization (method of use) of this type of energy storage device (battery, capacitor, etc.) is also encompassed herein.

While the primary advantage of this invention is enhanced safety for the cell, there are other advantages, as alluded to above, including reduced weight of the overall energy storage device through a reduced amount of metal weight in relation to such current collector components. Again, it is completely counterintuitive to utilize thin metallized coated polymeric layers, particularly of low dimensionally stable characteristics, for current collectors within such battery articles. The present mindset within this industry remains the thought that greater amounts of actual metal and/or insulator components are needed to effectuate the desired protective results (particularly from potential short circuit events). It has now been unexpectedly realized that not only is such a paradigm incorrect, but the effective remedy to short circuiting problems within lithium batteries, etc., is to reduce the amount of metal rather than increase, and couple the same with thermally unstable base layers. Thus, it has been not only realized, again, highly unexpectedly, that thin metal layers with such unstable base layers provide the ability to combat and effectively stop discharge events during short circuits, the overall effect is not only this far safer and more reliable result, but a significantly lower overall weight and volume of such component parts. Thus, the unexpected benefits of improved properties with lowered weight and volume requirements within energy storage products (batteries, etc.), accords far more to the industry than initially understood.

As a further explanation, aluminum, at a density of 2.7 g/cm$^3$, at 20 microns thick would weigh 54 g/m$^2$. However, the same metal coated at 1 micron on a 10-micron thick polypropylene film (density 0.9 g/cm3) would weigh 11.7 g/m$^2$. This current collector reduction in weight can reduce the weight of the entire target energy storage device (e.g., battery), increasing mobility, increasing fuel mileage or electric range, and in general enhance the value of mobile electric applications.

Additionally, because of the high strength of films, the above example can also be made thinner, a total thickness of 11 microns compared to 20 microns, for example, again reducing the volume of the cell, thereby effectively increasing the energy density. In this way, a current collector of less than 15 microns, preferably less than 12, more preferably less than 10, and most preferably less than 8 microns total thickness, can be made and utilized for such a purpose and function.

With the bulk resistivity of aluminum at $2.7\times10^{-8}$ ohm-m and of copper at $1.68\times10^{-8}$ ohm-m, a thin coating can be made with less than 1 ohm/square, or less than 0.5 ohms/square, or even less than 0.1 ohms/square, or less than 0.05 ohms/square. The thickness of these conductive coatings could be less than 5 microns, preferably than 3 microns, more preferably less than 2 microns, potentially most preferably even less than 1 micron. It is extremely counterintuitive, when standard materials of general use in the market contain 10 microns or more of metal, that suitable performance could be obtained using much less metal. Indeed, most of the metal present in typical storage devices is included to give suitable mechanical properties for high speed and automated processing. It is one of the advantages of this invention to use a much lower density polymer material to provide the mechanical properties, allowing the metal thickness to be reduced to a level at which the safety of the cell is improved because of the inability of the current collector to support dangerously high current densities that result from internal electrical shorts and result in thermal runaway, smoke and fire.

Additionally, these conductive layers can be made by multiple layers. For example, a layer of aluminum may be a base layer, coated by a thin layer of copper. In this way, the bulk conductivity can be provided by the aluminum, which is light, in expensive and can easily be deposited by vapor phase deposition techniques. The copper can provide additional conductivity and passivation to the anode, while not adding significant additional cost and weight. This example is given merely to illustrate and experts in the art could provide many other multilayer conductive structures, any of which are excellent examples of this invention.

These thin metal coatings will in general result in higher resistance than in an aluminum or copper current collector of normal practice, providing a distinguishing feature of this invention in comparison. Such novel suitable current collectors can be made at greater than 10 mohm/square, preferably greater than 20 mohm/square, more preferably greater than 50 mohm/square, and potentially most preferably even greater than 100 mohm/square.

Additionally, cells made with the thermally weak current collectors described above could be made even more safe if the separator has a high thermal stability, such as potentially exhibiting low shrinkage at high temperatures, including less than 5% shrinkage after exposure to a temperature of 200° C. for 1 hour, preferably after an exposure of 250° C. for one hour, and potentially more preferably after an exposure to a temperature of 300° C. for one hour. Existing separators are made from polyethylene with a melt temperature of 138° C. and from polypropylene with a melt temperature of 164° C. These materials show shrinkage of >50% at 150° C., as shown in FIG. 2; such a result is far too high for utilization with a thin current collector as now described herein. To remedy such a problem, it has been realized that the utilization of certain separators that shrink less than 50% at 150° C., or even less than 30%, or less than 10%, as measured under NASA TM—2010-216099 section 3.5 are necessary. Even ceramic coated separators show significant shrinkage at relatively modest temperatures, either breaking entirely or shrinking to more than 20% at 180° C. It is thus desirable to utilize a separator that does not break during the test, nor shrink to more than 20% at an exposure of 180° C. (at least), more preferably more than 10%, when measured under the same test standard. The most preferred embodiment would be to utilize a separator that shrinks less than 10% when exposed to a temperature of 200° C., or 250° C., or even 300° C.

For any of these metallized substrates, it is desirable to have a low thickness to facilitate increase the energy density of the cell. Any means can be used to obtain such thickness, including calendering, compressing, hot pressing, or even ablating material from the surface in a way that reduces total thickness. These thickness-reducing processes could be done before or after metallization. Thus, it is desirable to have a total thickness of the metallized substrate of less than 25 microns, preferably less than 20 microns, more preferably less than 16 microns, and potentially most preferably less than 14 microns. Commercial polyester films have been realized with thicknesses of at most 3 microns, and even lower at 1.2 microns. These types could serve as suitable substrates and allow the total thickness of the current collector to be less than 10 microns, preferably less than 6 microns, and more preferably less than 4 microns. Such ultra-thin current collectors (with proper conductivity as described above and throughout) may allow much higher energy density with improved safety performance, a result that has heretofore gone unexplored.

It is also desirable to have low weight for these metallized substrates. This could be achieved by the use of low density polymer materials such as polyolefins or other low-density polymers including polyethylene, polypropylene, and polymethylpentene, as merely examples. It could also be achieved by having an open pore structure in the substrate or even through utilization of low basis weight substrates. Thus, the density of the polymer used in the substrate material could be less than 1.4 g/cm$^3$, preferably less than 1.2 g/cm$^3$, and potentially more preferably less than 1.0 g/cm$^3$. Also, the areal density of the substrate material could be less than 20 g/m$^2$, preferably less than 16 g/m$^2$, and potentially most preferably less than 14 g/m$^2$. Additionally, the areal density of the metal coated polymer substrate material could be less than 40 g/m$^2$, preferably less than 30 g/m$^2$, more preferably less than 25 g/m$^2$, and potentially most preferably less than 20 g/m$^2$.

Low weight can also be achieved with a porous polymer substrate. However, the porosity must not be too high for these materials, as such would result in low strength and high thickness, effectively defeating the purpose of the goals involved. Thus, such base materials would exhibit a porosity lower than about 60%, preferably lower than 50%, and potentially more preferably lower than 40%. Since solid materials can be used for this type of metal coated current collector, there is no lower limit to the porosity.

High strength is required to enable the materials to be processed at high speeds into batteries. This can be achieved by the use of elongated polymers, either from drawn fibers or from uniaxially or biaxially drawn films.

As presented below in the accompanying drawings the descriptions thereof, an energy storage device, whether a battery, a capacitor, a supercapacitor and the like, is manufactured and thus provided in accordance with the disclosure wherein at least one current collector that exhibits the properties associated with no appreciable current movement after a short is contacting a cathode, an anode, or two separate current collectors contacting both, and a separator and electrolytes, are all present and sealed within a standard (suitable) energy storage device container, is provided. The cathode, anode, container, electrolytes, and in some situations, the separator, components are all standard, for the most part. The current collector utilized herewith and herein, however, is, as disclosed, not only new and unexplored within this art, but counterintuitive as an actual energy storage device component. Such is, again, described in greater detail below.

As noted above, in order to reduce the chances, if not totally prevent, thermal runaway within a battery cell (particularly a lithium ion rechargeable type, but others are possible as well, of course), there is needed a means to specifically cause any short circuit therein to basically exist within a short period of time, with reduced residence time within or on the subject current collector, and ultimately exhibit a resultant energy level of de minimis joule levels (i.e., less than 10, preferably less than 1, and most preferably less than 0.01). In such a situation, then, and as alluded to earlier, the electrical pathway from anode to cathode, and through the separator, with the thin conductive current collector in place, and organic flammable electrolyte present, it has been observed that the low-weight, thin current collector allows for such a desirable result, particularly in terms of dissipation of rogue charges at the collector surface and no appreciable temperature increase such that ignition of the electrolyte component would be imminent. Surprisingly, and without being bound to any specific scientific explanation or theory, it is believed that the conductive nature of the thin current collector material allows for short circuit electrical charges to merely reach the thin conductive current collector and immediately create a short duration high-energy event that reacts between the metal at the current collector surface with the electrical charge itself, thereby creating a metal oxide to form at that specific point on the current collector surface. The metal oxide provides insulation to further electrical activity and current applied dissipates instantaneously, leaving a potential deformation within the collector itself, but with the aforementioned metal oxide present to protect from any further electrical charge activity at that specific location. Thus, the remaining current collector is intact and can provide the same capability as before, thus further providing such protections to any more potential short circuits or like phenomena. In the case of thermal runaway in prior art battery products, the anode, cathode, current collectors and separator comprise the electrical pathway which generate heat and provide the spark to ignite the cell in reaction to a short circuit, as an example. The further presence of ion transporting flammable electrolytes thus allows for the effective dangers with high temperature results associated with such unexpected electrical charges. In essence, the heat generated at the prior art current collector causes the initial electrochemical reactions within the electrolyte materials, leading, ultimately to the uncontrolled ignition of the electrolyte materials themselves. Thus, the disclosed inventive current collector herein particularly valuable when utilized within battery cells including such flammable electrolytes. As examples, then, such electrolytes generally include organic solvents, such as carbonates, including propylene carbonate, ethylene carbonate, ethyl methyl carbonate, di ethyl carbonate, and di methyl carbonate, and others. These electrolytes are usually present as mixtures of the above materials, and perhaps with other solvent materials including additives of various types. These electrolytes also have a lithium salt component, an example of which is lithium hexafluorophosphate, $LiPF_6$. Such electrolytes are preferred within the battery industry, but, as noted, do potentially contribute to dangerous situations. Again, this inventive current collector in association with other battery components remedies these concerns significantly and surprisingly.

One way that this current collector will exhibit its usefulness is in the following test. A current source with both voltage and current limits can be set to a voltage limit similar to the operating voltage of the energy storage device in question. The current can then be adjusted, and the current collector tested under two configurations. In the first, a short strip of the current collector of known width is contacted through two metal connectors that contact the entire width of the sample. The current limit of the current source can be raised to see if there is a limit to the ability of the material to carry current, which can be measured as the total current divided by the width, achieving a result in A/cm, herein designated as the horizontal current density. The second configuration would be to contact the ground of the current source to one of the full width metal contacts, and then touch the tip of the probe, approximately 0.25 mm$^2$, to a place along the strip of the current collector. If the current is too high, it will burn out the local area, and no current will flow. If the current is not too high for the current collector, then the full current up to the limit of the current source will flow. The result is a limit of current in A/mm$^2$, herein designated as the vertical current density. In this way, a current collector which can reach a high current under both configurations would be similar to the prior art, and a current collector which could support the horizontal current when contacted under full width, but would not support a similar vertical current under point contact would be an example of the invention herein described.

For example, it may be desirable for a current collector to be able to support horizontal current density 0.1 A/cm, or 0.5 A/cm, or 1 A/cm or 2 A/cm or even 5 A/cm. And for a current collector that could support a horizontal current density as above, it would be desirable not to support a vertical current density of 0.1 A/mm$^2$, or 0.5 A/mm$^2$, or 1 A/mm$^2$ or 2 A/mm$^2$ or even 5 A/mm$^2$.

Such lithium ion battery thin films may require certain unique processing steps due to their unique qualities. However, many processing steps that are well known in the art may also be employed. In general, the process to produce a lithium ion battery with the inventive films comprises the steps of:

a. Providing an electrode having at least one metallized substrate with a coating of an ion storage material;
b. Providing a counterelectrode;
c. Layering said electrode and counterelectrode opposite each other with a separator component interposed between said electrode and said countelectrode;
d. Providing a package material including an electrical contact component, wherein said contact includes a portion present internally within said package material and a portion present external to said package material;
e. Electrically connecting said electrical contact with said metallized substrate;
f. Introducing at least one liquid electrolyte with ions internally within said package material; and
g. Sealing said package material.

The metallized substrate can be any substrate as described within this disclosure.

The ion storage material can for example be a cathode or anode material for lithium ion batteries, as are well known in the art. Cathode materials may include lithium cobalt oxide $LiCoO_2$, lithium iron phosphate $LiFePO_4$, lithium manganese oxide $LiMn_2O_4$, lithium nickel manganese cobalt oxide $LiNi_xMn_yCo_zO_2$, lithium nickel cobalt aluminum oxide $LiNi_xCo_yAl_zO_2$, or mixtures of the above or others as are known in the art. Anode materials may include graphite, lithium titanate $Li_4Ti_5O_{12}$, hard carbon, tin, silicon or mixtures thereof or others as are known in the art. In addition, the ion storage material could include those used in other energy storage devices, such as supercapacitors. In such supercapacitors, the ion storage materials will include activated carbon, activated carbon fibers, carbide-derived carbon, carbon aerogel, graphite, graphene, graphene, and carbon nanotubes.

The coating process can be any coating process that is generally known in the art. Knife-over-roll and slot die are commonly used coating processes for lithium ion batteries, but others may be used as well, including electroless plating. In the coating process, the ion storage material is in general mixed with other materials, including binders such as polyvinylidene fluoride or carboxymethyl cellulose, or other film-forming polymers. Other additives to the mixture include carbon black and other conducting additives.

Counterelectrodes include other electrode materials that have different electrochemical potentials from the ion storage materials. In general, if the ion storage material is a lithium ion anode material, then the counterelectrode would be made form a lithium ion cathode material. In the case where the ion storage material is a lithium ion cathode material, then the counterelectrode might be a lithium ion anode material. In the case where the ion storage material is a supercapacitor material, the counterelectrode can be made from either a supercapacitor material, or in some cases from a lithium ion anode or lithium ion cathode material. In each case, the counterelectrode would include an ion storage material coated on a current collector material, which could be a metal foil, or a metallized film such as in this invention.

In the layering process, the inventive electrode is layered with the counterelectrode with the electrode materials facing each other and a porous separator between them. As is commonly known in the art, the electrodes may be coated on both sides, and a stack of electrodes formed with the inventive electrode and counterelectrodes alternating with a separator between each layer. Alternatively, as is also known in the art, strips of electrode materials may be stacked as above, and then wound into a cylinder.

Packaging materials may include hard packages such as cans for cylindrical cells, flattened hard cases or polymer pouches. In each case, there must be two means of making electrical contact through the case that can be held at different voltages and can conduct current. In some instances, a portion of the case itself forms one means, while another is a different portion of the case that is electrically isolated from the first portion. In other instances, the case may be nonconducting, but allow two metal conductors to protrude through the case, often referred to as tabs.

Connecting the means to make electrical contact with the metallized substrate can include commonly used methods, such as welding, taping, clamping, stapling, riveting, or other mechanical means. Because the metal of the metallized substrate can be very thin, in order to enable an interface that allows for high current flow, a face-to-face contact is generally required, giving high surface area between the means of making electrical contact through the case and the metallized substrate. To carry sufficient current, this surface area should be higher than 1 square millimeter ($10^{-12}$ square meters) but may need to be higher than 3 square millimeters, or even 5 square millimeters or more preferably 10 square millimeters.

The liquid electrolyte is typically a combination/mixture of a polar solvent and a lithium salt. Commonly used polar solvents include, as noted above, propylene carbonate, ethylene carbonate, dimethyl carbonate, diethyl carbonate, but other polar solvents, including ionic liquids or even water may be used. Lithium salts commonly utilized within this industry include, without limitation, $LiPF_6$, $LiPF_4$, $LiBF_4$, $LiClO_4$ and others. The electrolyte may also contain additives as are known in the art. In many cases, the electrolytes can be flammable, in which the safety features of the inventive metallized substrate current collectors can be advantageous preventing dangerous thermal runaway events which result in fire and damage both to the cell and external to the cell.

BRIEF DESCRIPTION OF THE DRAWINGS

FIG. 1 is a Prior Art depiction of the architecture of a wound cell, such as an 18650 cell.

FIG. 2 is a Prior Art depiction of the shrinkage as a function of temperature as measured by Dynamic Mechanical Analysis of several lithium ion battery separators, as measured according to NASA/TM—2010-216099 "Battery Separator Characterization and Evaluation Procedures for NASA's Advanced Lithium Ion Batteries," which is incorporated herein by reference, section 3.5. Included are first generation separators (Celgard PP, Celgard tri-layer), $2^{nd}$ generation separators (ceramic PE) and $3^{rd}$ generation separators (Silver, Gold, Silver AR).

FIGS. 6a and 6b show images of comparative examples 1-2, each after having been touched by the tip of a hot soldering iron. The comparative examples do not change after touching with a hot soldering iron.

FIGS. 7a, 7b, and 7c show images of examples 1-3, each after having been touched by the tip of a hot soldering iron. The examples 1-3 all exhibit shrinkage as described in this disclosure for substrates to be metalized.

FIGS. 8a, 8b, and 8c show images of examples 4-6, each after having been touched by the tip of a hot soldering iron. The example 4 exhibits shrinkage as described in this disclosure for substrates to be metalized. Example 5 has a fiber that will dissolve under heat in lithium ion electrolytes. Example 6 is an example of a thermally stable substrate that would require a thin conductive layer to function as the current invention.

FIGS. 10a and 10b are optical micrographs of Comparative Examples 3 and 4 after shorting, showing ablation of the area around the short but no hole.

FIGS. 11a and 11b are optical micrographs of two areas of Example 14 after shorting, showing clear holes in the material caused by the high current density of the short.

DETAILED DESCRIPTION OF THE PREFERRED EMBODIMENTS AND EXAMPLES

The following descriptions and examples are merely representations of potential embodiments of the present disclosure. The scope of such a disclosure and the breadth thereof in terms of claims following below would be well understood by the ordinarily skilled artisan within this area.

As noted above, the present disclosure is a major shift and is counterintuitive from all prior understandings and remedies undertaken within the lithium battery (and other energy storage device) industry. To the contrary, the novel devices described herein provide a number of beneficial results and properties that have heretofore been unexplored, not to mention unexpected, within this area. Initially, though, as comparisons, it is important to note the stark differences involved between prior devices and those currently disclosed and broadly covered herein.

Short Circuit Event Examples

Comparative Example 1

Figure 5A:
FIG. 5a is a Prior Art depiction of a thick aluminum current collector, generally between 12-20 microns thick.

A cathode for a lithium iron phosphate battery was obtained from GB Systems in China. The aluminum tab was removed as an example of a commercial current collector, and the thickness, areal density and resistance were measured, which are shown in Table 1, below. The aluminum foil was then touched with a hot soldering iron for 5 seconds, which was measured using an infrared thermometer to have a temperature of between 500 and 525° F. There was no effect of touching the soldering iron to the current collector. The thickness, areal density and resistance were measured. The material was placed in an oven at 175° C. for 30 minutes and the shrinkage measured. A photograph was taken and included in FIG. 6. FIG. 5 provides a representation of the traditional current collector within such a comparative battery.

Comparative Example 2

An anode for a lithium iron phosphate battery was obtained from GB Systems in China. The copper tab was removed as an example of a commercial current collector, and the thickness, areal density and resistance were measured, which are shown in Table 1, below. The copper foil was then touched with a hot soldering iron in the same way as Example 1. There was no effect of touching the soldering iron to the current collector. The thickness, areal density and resistance were measured. The material was placed in an oven at 175° C. for 30 minutes and the shrinkage measured. A photograph was taken and included in FIG. 6. As in Comparative Example 1, FIG. 5 provides a representation of the internal structure of such a battery. The thickness of the current collector is significant as it is a monolithic metal structure, not a thin type as now disclosed. FIG. 5 provides a representation of the traditional current collector within such a comparative battery.

Example 1

Polypropylene lithium battery separator material was obtained from MTI Corporation. The material was manufactured by Celgard with the product number 2500. The thickness, areal density and resistance were measured, which are shown in Table 1, below. The separator was then touched with a hot soldering iron in the same way as Example 1. Touching the thermometer to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7.

Example 2

Ceramic coated polyethylene lithium battery separator material was obtained from MTI Corporation. The thickness, areal density and resistance were measured, which are shown in Table 1, below. The separator was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7a.

Example 3

Ceramic coated polypropylene lithium battery separator material was obtained from MTI Corporation. The thickness, areal density and resistance were measured, which are shown in Table 1, below. The separator was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7b.

Example 4

Aluminized biaxially oriented polyester film was obtained from All Foils Inc., which is designed to be used for helium filled party balloons. The aluminum coating holds the helium longer, giving longer lasting loft for the party balloons. The thickness, areal density and resistance were measured, which are shown in Table 1, below. The film was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 8. Compared to the commercially available aluminum current collector of Comparative Example 1, this material is 65% thinner and 85% lighter, and also retreats away from heat, which in a lithium ion cell with an internal short would have the effect of breaking the internal short.

Example 5

Dreamweaver Silver 25, a commercial lithium ion battery separator was obtained. It is made from a blend of cellulose and polyacrylonitrile nanofibers and polyester microfibers in a papermaking process, and calendered to low thickness. The separator was then touched with a hot soldering iron in the same way as Example 1. Touching the thermometer to the current collector did not create a hole. The thickness, areal density and resistance were measured. The material was placed in an oven at 175° C. for 30 minutes and the shrinkage measured. Compared to the prior art, comparative examples #3-5, these materials have the advantage that they do not melt or shrink in the presence of heat, and so in a lithium ion battery with an internal short, will not retreat to create an even bigger internal short. Such is seen in FIG. 8*a*.

Example 6

Dreamweaver Gold 20, a commercially available prototype lithium ion battery separator was obtained. It is made from a blend of cellulose and para-aramid nanofibers and polyester microfibers in a papermaking process, and calendered to low thickness. The separator was then touched with a hot soldering iron in the same way as Example 1. Touching the thermometer to the current collector did not create a hole, as shown in FIG. 8*b*. The thickness, areal density and resistance were measured. The material was placed in an oven at 175° C. for 30 minutes and the shrinkage measured. The advantages of this separator compared to the prior art separators are the same as for Example 2.

TABLE 1

| Example | Material | Thickness | Areal Density | Resistance | Shrinkage (175 C.) | Solder Tip Hole Size |
|---|---|---|---|---|---|---|
| Comp Example 1 | Aluminum | 30 μm | 80 g/m² | <0.1 mOhm/square | 0% | No hole |
| Comp Example 2 | Copper | 14 μm | 125 g/m² | <0.1 mOhm/square | 0% | No hole |
| Example 1 | PP | 24 μm | 14 g/m² | Infinite | Melted | 7.5 μm |
| Example 2 | PP ceramic | 27 μm | 20 g/m² | Infinite | Melted | 2 μm/1 μm |
| Example 3 | PE ceramic | 27 μm | 20 g/m² | Infinite | Melted | 5 μm/2 μm |
| Example 4 | Aluminized PET | 13 μm | 12 g/m² | 6.3 Ohm/square | 33% | 2 μm |
| Example 5 | Fiber blend | 27 μm | 16 g/m² | Infinite | 2% | No hole |
| Example 6 | Fiber blend | 23 μm | 16 g/m² | Infinite | 0% | No hole |

Comparative Examples 1-2 are existing current collector materials, showing very low resistance, high areal density and no response at exposure to either a hot solder tip or any shrinkage at 175° C.

Examples 1-3 are materials that have infinite resistance, have low areal density and melt on exposure to either 175° C. or a hot solder tip. They are excellent substrates for metallization according to this invention.

Example 4 is an example of an aluminized polymer film which shows moderate resistance, low areal density and shrinks when exposed to 175° C. or a hot solder tip. It is an example of a potential cathode current collector composite film according to this invention. In practice, and as shown in further examples, it may be desirable to impart a higher level of metal coating for higher power batteries.

Examples 5-6 are materials that have infinite resistance, have low areal density, but have very low shrinkage when exposed to 175° C. or a hot solder tip. They are examples of the polymer substrate under this invention when the thickness of the metallized coating is thin enough such that the metallized coating will deteriorate under the high current conditions associated with a short. Additionally, the cellulose nanofibers and polyester microfibers will oxidize, shrink and ablate at temperatures far lower than the melting temperatures of the metal current collectors currently in practice.

Example 5 additionally is made from a fiber, polyacrylonitrile, that swells on exposure to traditional lithium ion carbonate electrolytes, which is also an example of a polymer substrate under this invention such that the swelling will increase under heat and create cracks in the metalized coating which will break the conductive path, improving the safety of the cell by eliminating or greatly reducing the uniform conductive path of the current collector on the exposure to heat within the battery.

Example 7

The material utilized in Example 5 was placed in the deposition position of a MBraun Vacuum Deposition System, using an intermetallic crucible and aluminum pellets. The chamber was evacuated to 3×10-5 mbar. The power was increased until the aluminum was melted, and then the power set so the deposition rate was 3 Angstroms/s. The deposition was run for 1 hour, with four samples rotating on the deposition plate. The process was repeated three times, so the total deposition time was 4 hours. The samples were measured for weight, thickness and resistance (DC and 1 kHz, 1 inch strip measured between electrodes 1 inch apart), which are shown in Table 2 below. Point resistance was also measured using a Hioki 3555 Battery HiTester at 1 kHz with the probe tips 1" apart. The weight of added aluminum was calculated by the weight added during the process divided by the sample area. This is divided by the density of the material to give the average thickness of the coating.

Example 8

A nonwoven polymer substrate was made by taking a polyethylene terephthalate microfiber with a flat cross section and making hand sheets at 20 g/m² using the process of Tappi T206. These hand sheets were then calendered at 10 m/min, 2000 lbs/inch pressure using hardened steel rolls at 250° F. This material was metalized according to the process of Example 7, and the same measurements taken and reported in Table 8.

Example 9

Figure 9A:
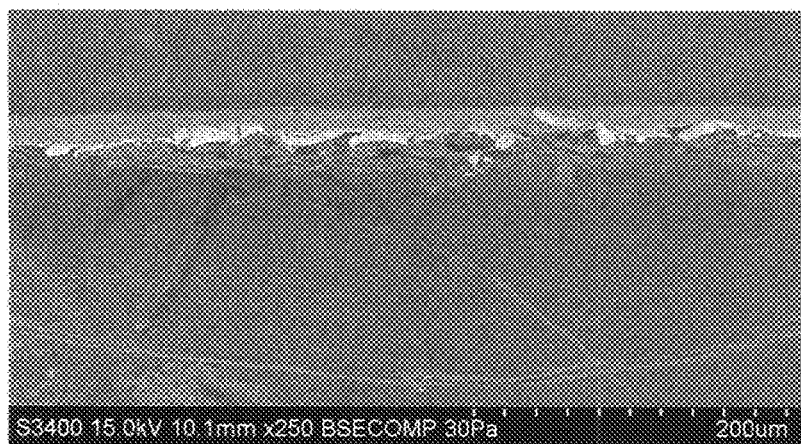
FIGS. 9a, 9b, and 9c are SEMs at different magnifications in cross section and one showing the metalized surface of one possible embodiment of one current collector as now disclosed as described in Example 9. The metal is clearly far thinner than the original substrate, which was 20 microns thick.
Figure 9B:
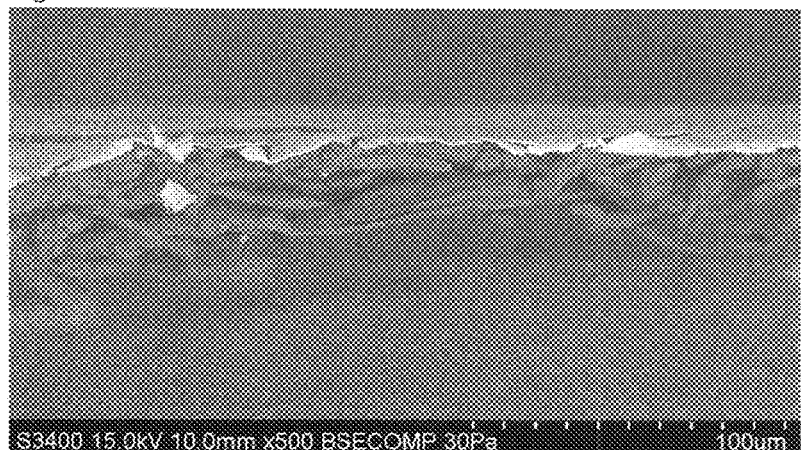
Figure 9C:
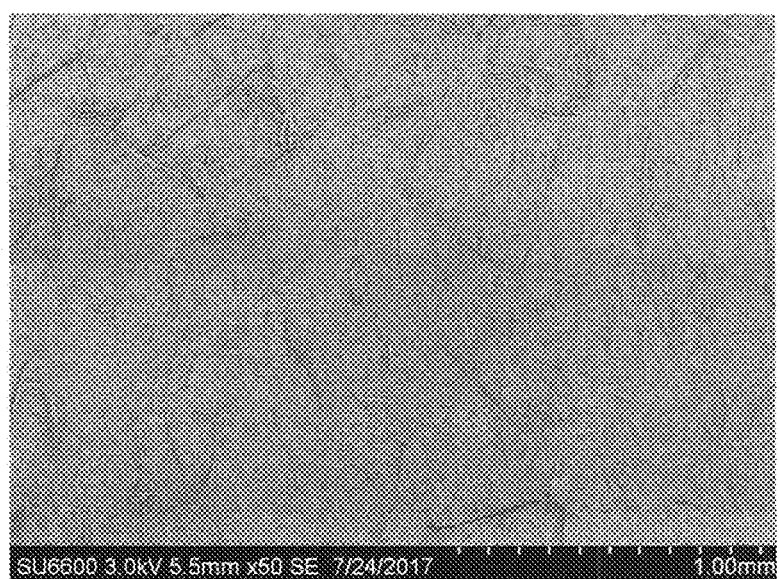

Material according to Example 5 was deposited according to the process of Example 7, except that the coating was done at a setting of 5 Angstroms/second for 60 minutes. The samples were turned over and coated on the back side under the same procedure. These materials were imaged under a scanning electron microscope (SEM), both on the surface and in cross section, and the images are presented in FIGS. 9, 9*a*, and 9*b*.

Example 10

Materials were prepared according to the procedure of Example 9, except the deposition on each side was for only 20 minutes.

Example 11

The polymer substrate of Example 8 was prepared, except that the sheets were not calendered. The deposition of aluminum is at 5 Angstroms/second for 20 minutes on each side. Because the materials were not calendered, the porosity is very high, giving very high resistance values with a thin coat weight. Comparing Example 11 to Example 8 shows the benefits of calendering, which are unexpectedly high.

TABLE 2

| Sample | Added weight g/m$^2$ | DC Resistance Ohms/square | 1 kHz Resistance Units Ohms/square | 1 kHz point resistance Ohms | Average coating thickness microns |
|---|---|---|---|---|---|
| Example 7 | 3.5 | 0.7 | 0.5 | 0.1 | 1.3 |
| Example 8 | 2.0 | 7 | 7 | 0.4 | 0.7 |
| Example 9 | 2.2 | | | 0.2 | 0.8 |
| Example 10 | 0.8 | | | 1.7 | 0.3 |
| Example 11 | 0.8 | | | 100 | 0.3 |

Example 12

The aluminum coated polymer substrate from Example 9 was coated with a mixture of 97% NCM cathode material (NCM523, obtained from BASF), 1% carbon black and 2% PVDF binder in a solution of N-Methyl-2-pyrrolidone. The coat weight was 12.7 mg/cm2, at a thickness of 71 microns. This material was cut to fit a 2032 coin cell, and paired with graphite anode coated on copper foil current collector (6 mg/cm2, 96.75% graphite (BTR), 0.75% carbon black, 1.5% SBR and 1% CMC). A single layer coin cell was made by placing the anode, separator (Celgard 2320) and the NCM coated material into the cell, flooding with electrolyte (60 uL, 1.0M LiPF6 in EC:DEC:DMC=4:4:2 vol+2w. % VC) and sealing the cell by crimping the shell. To obtain adequate conductivity, a portion of the aluminum coated polymer substrate from Example 9 was left uncoated with cathode material and folded over to contact the shell of the coin cell, completing the conductive pathway. The cell was formed by charging at a constant current of 0.18 mA to 4.2 V, then at constant voltage (4.2 V) until the current dropped to 0.04 mA. The cell was cycled three times between 4.2 V and 3.0 V at 0.37 mA, and gave an average discharge capacity of 1.2 mAh.

Example 13

A cell was made according to the procedure and using the materials from Example 12, except the separator used was Dreamweaver Silver 20. The cell was formed by charging at a constant current of 0.18 mA to 4.2 V, then at constant voltage (4.2 V) until the current dropped to 0.04 mA. The cell was cycled three times between 4.2 V and 3.0 V at 0.37 mA, and gave an average discharge capacity of 0.8 mAh. Thus in this and the previous example, working rechargeable lithium ion cells were made with an aluminum thickness of less than 1 micron.

Comparative Example 3

The aluminum tab of Comparative Example 1, approximately 2 cm×4 cm was connected to the ground of a current source through a metal connector contacting the entire width of the sample. The voltage limit was set to 4.0 V, and the current limit to 1.0 A. A probe connected to the high voltage of the current source was touched first to a metal connector contacting the entire width of the sample, and then multiple times to the aluminum tab, generating a short circuit at 1.0 A. The tip of the probe was approximately 0.25 mm$^2$ area. When contacted across the entire width, the current flowed normally. On initial touch with the probe to the tab, sparks were generated, indicating very high initial current density. The resultant defects in the current collector only sometimes resulted in holes, and in other times there was ablation but the current collector remained intact. In all cases the circuit remained shorted with 1.0 A flowing. A micrograph was taken of an ablated defect, with no hole, and is shown in FIG. 10. The experiment was repeated with the current source limit set to 5.0, 3.0, 0.6 A, 0.3 A and 0.1 A, and in all cases the result was a continuous current at the test current limit, both when contacted across the entire width of the current collector and using the point probe of approximately 0.25 mm$^2$ tip size.

Comparative Example 4

The copper tab of Comparative Example 2 of similar dimensions was tested in the same way as Comparative Example 3. When contacted across the entire width, the current flowed normally. On initial touch with the probe to the tab, sparks were generated, indicating very high initial current density. The resultant defects in the current collector only sometimes resulted in holes, and in other times there was ablation but the current collector remained intact. In all cases the circuit remained shorted with 0.8 A flowing. A micrograph was taken of an ablated defect, with no hole, and is shown in FIG. 10a. The experiment was repeated with the current source limit set to 5.0, 3.0, 0.6 A, 0.3 A and 0.1 A, and in all cases the result was a continuous current at the test current limit, both when contacted across the entire width of the current collector and using the point probe of approximately 0.25 mm$^2$ tip size.

Example 14

The inventive aluminum coated polymer substrate material of Example 7 of similar dimensions was tested using the same method as Comparative Examples 3-4. When contacted across the entire width, the current flowed normally. In each case of the touch of the probe to the inventive current collector directly, the sparks generated were far less, and the current ceased to flow after the initial sparks, leaving an open circuit. In all cases, the resultant defect was a hole. Micrographs of several examples of the holes are shown in FIGS. 11 and 11a. The experiment was repeated with the current source limit set to 5.0, 3.0, 0.6 A, 0.3 A and 0.1 A, and in all cases the result a continuous flow of current when contacted through the full width connectors, and no current flowing through the inventive example when contacted directly from the probe to the inventive current collector example.

The key invention shown is that, when exposed to a short circuit as in Comparative Examples 3-4 and in Example 14, with the prior art the result is an ongoing short circuit, while with the inventive material the result is an open circuit, with no ongoing current flowing (i.e., no appreciable current movement). Thus, the prior art short circuit can and does generate heat which can melt the separator, dissolve the SEI layer, and result in thermal runaway of the cell, thereby igniting the electrolyte. The open circuit of the inventive current collector will not generate heat and thus provides for a cell which can support internal short circuits without allowing thermal runaway and the resultant smoke, heat and flames.

Examples 15 and 16 and Comparative Examples 5 and 6

Figure 3A:
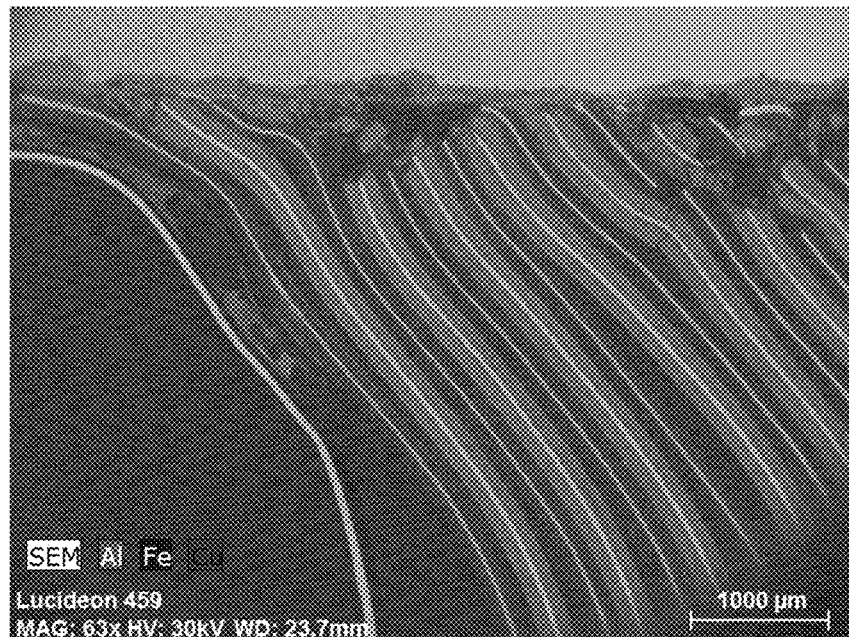
FIG. 3a is a Prior Art depiction of a scanning electron micrograph (SEM) of the cross section of a pouch cell that has undergone a nail penetration test. The layers are aluminum and copper as mapped by BEI (backscattered electron imaging). The nail is vertical on the left side. In each case, the aluminum layer has retreated from the nail, leaving behind a "skin" of aluminum oxide, an insulator.
Figure 3B:
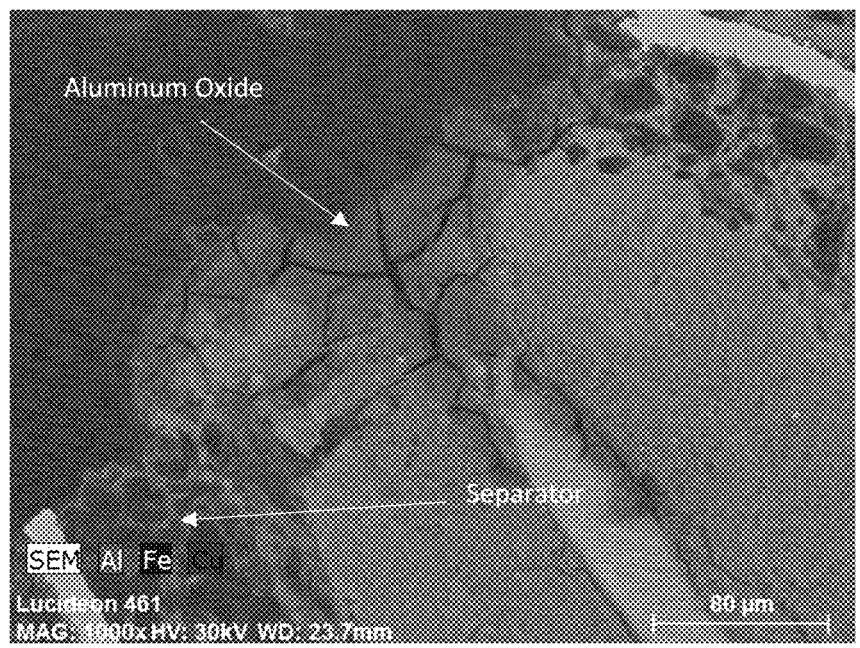
FIG. 3b is a Prior Art depiction of a zoom in on one of the layers from the image shown in FIG. 3a. It shows a close up of the aluminum oxide layer, and also reveals that the separator had not shrunk at all and was still separating the electrodes to the very edge.
Figure 4:
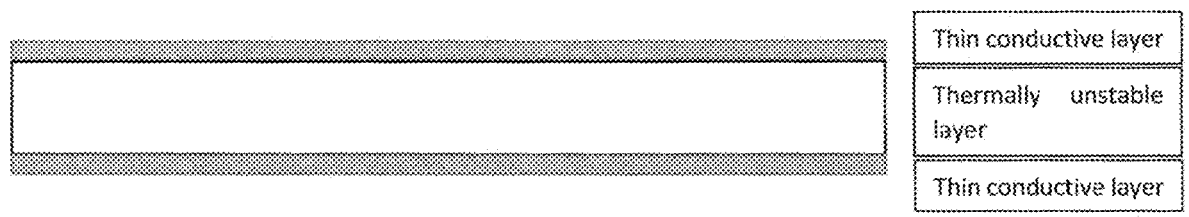
FIG. 4 is a depiction of the invention, where the thin layer of conductive material is on the outside, and the center substrate is a layer that is thermally unstable under the temperatures required for thermal runaway. This substrate can be a melting layer, a shrinking layer, a dissolving layer, an oxidizing layer, or other layer that will undergo a thermal instability at a temperature between 100° C. and 500° C.
Figure 5B:
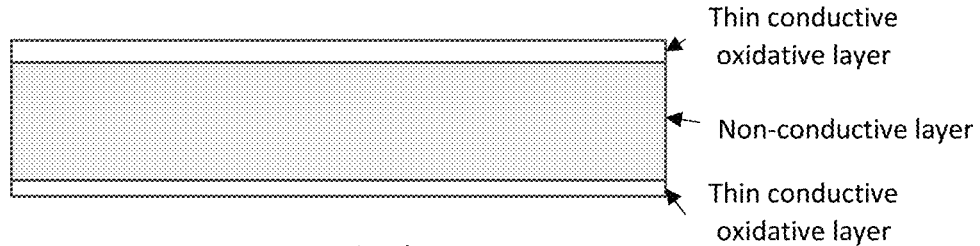
FIG. 5b is a depiction of the current invention, showing a 14-micron thick substrate with 1 micron of aluminum on each side. In the case of the inventive current collector, it is not capable of carrying the high currents associated with a short circuit, while the thick current art is and does.

Two metallized films were produced on 10 micron polyethylene terephthalate film in a roll to roll process. In this process, a roll of the film was placed in a vacuum metallization production machine (an example of which is TopMet 4450, available from Applied Materials), and the chamber evacuated to a low pressure. The roll was passed over heated boats that contain molten aluminum at a high rate of speed, example 50 m/min. Above the heated boats containing molten aluminum is a plume of aluminum gas which deposits on the film, with the deposition rate controlled by speed and aluminum temperature. A roll approximately 500 m long and 70 cm wide was produced through multiple passes until the aluminum coating was ~300 nm. The coating process was repeated to coat the other side of the film, with the resultant product utilized herein as Example 15 (with the inventive current collector of FIG. 4 a depiction of that utilized in this Example). Example 16 was thus produced in the same way, except the metal in the boat was copper (and with the depiction of FIG. 5B representing the current collector utilized within this inventive structure). The basis weight, thickness and conductivity of each film were measured, and are reported below in Table 3. The coating weight was calculated by subtracting 13.8 g/m², the basis weight of the 10 micron polyethylene terephthalate film. The "calculated coating thickness" was calculated by dividing the coating weight by the density of the materials (2.7 g/cm³ for aluminum, 8.96 g/cm³ for copper), and assuming equal coating on each side.

Comparative Example 5 is a commercially obtained aluminum foil 17 microns thick. Comparative Example 6 is a commercially obtained copper foil 50 microns thick. Comparative Example 7 is a commercially obtained copper foil 9 microns thick.

TABLE 3

| Sample | Basis Weight g/m² | Coating Weight g/m² | Thickness Microns | DC Resistance Ohms | Calculated coating thickness microns |
|---|---|---|---|---|---|
| Example 15 | 17 | 3 | 11 | 0.081 | 0.5 |
| Example 16 | 24 | 10 | 11 | 0.041 | 0.5 |
| Comparative Example 5 | 46 | | 17 | | |
| Comparative Example 6 | 448 | | 50 | | |
| Comparative Example 7 | 81 | | 9 | | |

Example 15, Example 16, Comparative Example 5 and Comparative Example 6 were subjected to a further test of their ability to carry very high current densities. A test apparatus was made which would hold a polished copper wire with radius 0.51 mm (24 AWG gauge) in contact with a current collector film or foil. The film or foil under test was grounded with an aluminum contact held in contact with the film or foil under test, with contact area >1 square centimeter. The probe was connected in series with a high power 400 W resistor of value 0.335 ohms, and connected to a Volteq HY3050EX power supply, set to control current. The current collector to be measured was placed in the setup, with the polished wire in contact with the surface of the current collector at zero input current. The current was increased in 0.2 ampere increments and held at 30 seconds for each increment, while the voltage across the resistor was measured. When the voltage dropped to zero, indicating that current was no longer flowing, the sample was shown to fail. Each of Example 15, Example 16, Comparative Example 5 and Comparative Example 6 were tested. Example 15 failed at a 7 A (average of two measurements). Example 16 failed at 10.2 A (average of two measurements). Neither of Comparative Example 5 nor Comparative Example 6 failed below 20 A. Both Example 15 and Example 16 showed holes in the current collector of radius >1 mm, while neither of the Comparative Examples 5 or 6 showed any damage to the foil. In this example test, it would be advantageous to have a current collector that is unable to carry a current of greater than 20 A, or preferably greater than 15 A or more preferably greater than 12 A.

Figure 12:
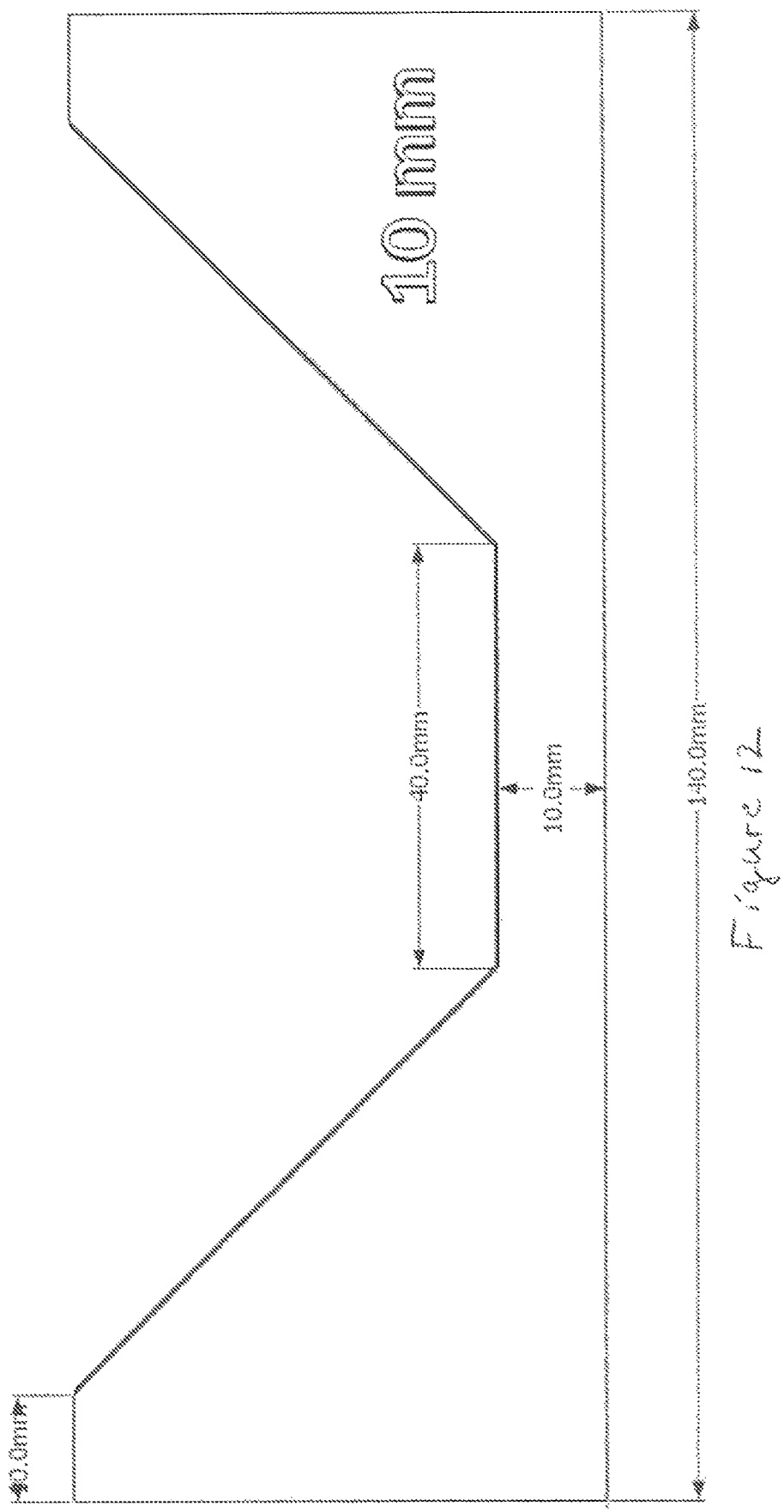
FIG. 12 shows a depiction of the size and shape of a current collector utilized for Examples noted below.

In another test, meant to simulate using these inventive current collectors as a tab connecting the electrode stack of a cell to the electrical devices in use (either inside or outside the cell), Examples 15 and 16 and Comparative Examples 5 and 6 were subjected to a current capacity test along the strip. To prepare the samples for the test, the current collectors were cut into the shape shown in FIG. 12, which consists of a strip of material that is four centimeters by on centimeter (4 cm×1 cm), with the ends of the strip ending in truncated right isosceles triangles of side 4 cm. Each of the triangles of the test piece was contacted through a piece of aluminum with contact surface area >1 cm. One side was connected through a 400 W, 0.335 ohm resistor, and this circuit was connected to a Volteq HY3050EX power supply. The voltage was measured across the resistors to measure the current, and the piece was shown to fail when this voltage dropped to zero. For each test, the piece was connected with the power supply set to zero current, and then increased in 0.2 A increments and allowed to sit for 30 seconds at each new voltage, until the sample failed and the current flowing dropped to zero. The test was configured so that the metallized current collectors could be measured with contact either on one side, or on both sides of the metallized current collector. The currents at failure are shown below in Table 4. For materials tested in a 4 cm×1 cm strip, it would be advantageous to provide an internal fuse by limited the amount of current that can flow to be below 20 A, or preferably below 15 A, or more preferably below 10 A, each with either single or double sided contact.

TABLE 4

| Sample | Single Sided Failure Voltage V | Double Sided Failure Voltage V |
|---|---|---|
| Example 15 | 2.7 | 4.5 |
| Example 16 | 24 | 10 |
| Comparative Example 5 | No failure below 20 A | No failure below 20 A |
| Comparative Example 6 | No failure below 20 A | No failure below 20 A |

Examples 17-19 and Comparative Example 8

Cells were made by coating standard foil current collectors and the metallized PET film current collectors from Examples 15 and 16 with electrode materials. NMC 523 cathode materials were prepared using BASF NMC523 (97%), carbon black (2%) and PVDF (1%) in NMP solvent, and coated on the aluminum current collector (15 micron aluminum current collector) and Example 15 were at a basis weight of 220 g/m$^2$, corresponding to a cathode loading density of 3.3 mAh/cm$^2$. Anode materials were prepared by using graphite BTR-918S (94%), carbon black (5%) and PVDF (1%) in NMP solvent, and coating on the copper current collector (18 micron copper current collector) at 118 g/m$^2$, corresponding to an anode loading density of 4.0 mAh/cm$^2$. Four double sided cathodes were prepared, and three double sided anodes and two single sided anodes. These were stacked with Celgard 2500 separator to form small pouch cells, which were then filled with electrolyte and sealed with designed capacity 1 Ah. Four types of cells were made by different combinations of foil materials, and the capacity measured at C/10 and C/5 (that is, 0.1 A and 0.2 A). The cells were formed by charging at 100 mA to 4.2 V, and held at 4.2 V until the current dropped to 10 mA. The fully formed cells were then weighed, and tested for capacity by discharging at C/10, then charging at C/10 and discharging at C/5. These results are shown in Table 5, below.

TABLE 5

| Sample | Cathode Current Collector | Anode Current Collector | Cell Weight Units Grams | C/10 Capacity mAh | C/5 Capacity mAh |
|---|---|---|---|---|---|
| Comparative Example 8 | Al Foil | Cu Foil | 27 | 924 | 615 |
| Example 17 | Example 15 | Cu Foil | 26.8 | 1049 | 751 |
| Example 18 | Al Foil | Example 16 | 24.7 | 1096 | 853 |
| Example 19 | Example 15 | Example 16 | 24.7 | 1057 | 848 |

Thus, it has been shown that the Examples provided above exhibit the desirable thickness, metal coating, and conductivity results needed to prevent thermal runaway within an electrolyte-containing battery, thereby providing not only a much safer and more reliable type, but one that requires far less internal weight components than ever before, without sacrificing safety, but, in fact, improving thereupon.

Having described the invention in detail it is obvious that one skilled in the art will be able to make variations and modifications thereto without departing from the scope of the present invention. Accordingly, the scope of the present invention should be determined only by the claims appended hereto.

The invention claimed is:

1. An energy storage device comprising an anode, a cathode, at least one separator present interposed between said anode and said cathode, at least one liquid electrolyte, and at least one current collector in contact with at least one of said anode and said cathode, wherein said at least one current collector has a top surface and a bottom surface; wherein said at least one separator is of a polymeric, ceramic, or nonwoven structure; wherein said at least one current collector is a nonconductive material having a conductive coating on both surfaces thereof; wherein said at least one current collector exhibits the capability to carry a current density when operating normally along a horizontal current pathway, and wherein said at least one separator does not exhibit a break therein when exposed to a temperature of 180° C. nor exhibit shrinkage in excess of 20% at 180° C. when subjected to the shrinkage test described in NASA TM—2010-216099 section 3.5.

2. An energy storage device comprising an anode, a cathode, at least one separator present interposed between said anode and said cathode, at least one liquid electrolyte, and at least one current collector in contact with at least one of said anode and said cathode, wherein said at least one current collector has a top surface and a bottom surface; wherein said at least one separator is of a polymeric, ceramic, or nonwoven structure; wherein said at least one current collector is a nonconductive material substrate having a conductive coating on both surfaces thereof; wherein said at least one current collector exhibits the capability to carry a current density when operating normally along a horizontal current pathway, and wherein said at least one current collector exhibits conductivity between said conductive material coated on one side thereof to said conductive material coated on the opposite side thereof.

* * * * *